(12) United States Patent
Carr et al.

(10) Patent No.: US 6,619,682 B2
(45) Date of Patent: Sep. 16, 2003

(54) SCOOTER

(75) Inventors: Nevin P. Carr, Virginia Beach, VA (US); David P. Maurer, Norfolk, VA (US)

(73) Assignee: Cactus Marketing Services, L.L.C., Chesapeake, VA (US)

( * ) Notice: Subject to any disclaimer, the term of this patent is extended or adjusted under 35 U.S.C. 154(b) by 0 days.

(21) Appl. No.: 09/956,869

(22) Filed: Sep. 21, 2001

(65) Prior Publication Data

US 2003/0001356 A1 Jan. 2, 2003

Related U.S. Application Data

(60) Provisional application No. 60/301,801, filed on Jul. 2, 2001.

(51) Int. Cl.[7] .................................................. B62M 5/00
(52) U.S. Cl. ........................ 280/253; 280/255; 280/256; 280/257; 280/258
(58) Field of Search ........................ 280/87.01, 87.041, 280/87.021, 253, 258, 251, 252, 255, 256, 257

(56) References Cited

U.S. PATENT DOCUMENTS

| | | | |
|---|---|---|---|
| 95,325 A | * 9/1869 | Coleman | 74/143 |
| 732,120 A | 6/1903 | Schmidt | 280/11.115 |
| 1,315,878 A | * 9/1919 | Stocks | 280/254 |
| 1,507,541 A | * 9/1924 | Wilson | 280/255 |
| 1,509,898 A | 9/1924 | McConnell | |
| 1,511,151 A | 10/1924 | Wilson | 280/255 |
| 1,562,553 A | 11/1925 | Hansen | 280/215 |
| 1,690,342 A | 11/1928 | Madsen | |
| 1,788,774 A | * 1/1931 | Matushak | 280/258 |
| 1,792,045 A | * 2/1931 | Siefken | 280/251 |
| 1,798,971 A | * 3/1931 | Clements | 280/215 |
| 1,876,859 A | 9/1932 | Collela | |
| 2,086,445 A | 7/1937 | Smith | |
| 2,225,304 A | 12/1940 | Killin, Jr. | |
| 2,436,199 A | 2/1948 | Cartmill | 280/255 |
| 2,466,105 A | 4/1949 | Hoffman | 280/221 |
| 3,659,871 A | 5/1972 | Hott | 280/221 |
| 3,945,453 A | 3/1976 | Black | 180/54.2 |
| 3,998,469 A | 12/1976 | Ruys | |
| 4,473,236 A | 9/1984 | Stroud | 280/258 |
| 4,657,273 A | 4/1987 | Slater | 280/221 |
| 4,666,173 A | 5/1987 | Graham | |
| 4,761,014 A | 8/1988 | Huang | 280/258 |
| 4,828,284 A | * 5/1989 | Sandgren | 280/221 |
| 4,861,055 A | 8/1989 | Jones | 280/234 |
| 5,121,654 A | 6/1992 | Fasce | |
| 5,163,886 A | * 11/1992 | Seol | 482/57 |
| 5,816,592 A | 10/1998 | Horton, II et al. | 280/87.041 |
| 5,816,597 A | 10/1998 | Tsai | 280/226.1 |
| 6,012,539 A | 1/2000 | Patmont | 180/223 |
| 6,173,981 B1 | * 1/2001 | Coleman | 280/253 |
| 6,241,269 B1 | 6/2001 | Fan | 280/265 |
| 6,325,400 B1 | * 12/2001 | Lai | 280/253 |

FOREIGN PATENT DOCUMENTS

| | | | | |
|---|---|---|---|---|
| GB | 2044194 A | * 10/1980 | ............ | B62B/1/04 |
| GB | 2219261 A | * 12/1989 | ............ | B62M/1/04 |
| GB | 2246986 A | * 2/1992 | ............ | B62M/1/04 |
| GB | WO 99/22980 | * 5/1999 | ............ | B62M/1/04 |

OTHER PUBLICATIONS

Kick 'N Go Manual from Honda Co.

* cited by examiner

*Primary Examiner*—Lesley D. Morris
*Assistant Examiner*—Daniel Yeagley
(74) *Attorney, Agent, or Firm*—Greenblum & Bernstein, P.L.C.

(57) ABSTRACT

An occupant propelled vehicle is provided that includes a frame having a front portion and a rear portion, front and rear wheels, a platform, a steering mechanism and a drive mechanism. The drive mechanism may include a drive sprocket mounted on the frame, a driven sprocket, an endless chain provided around the drive sprocket and driven sprocket, and a pedal for an occupant to drive the drive sprocket and propel the vehicle in a forward direction.

21 Claims, 28 Drawing Sheets

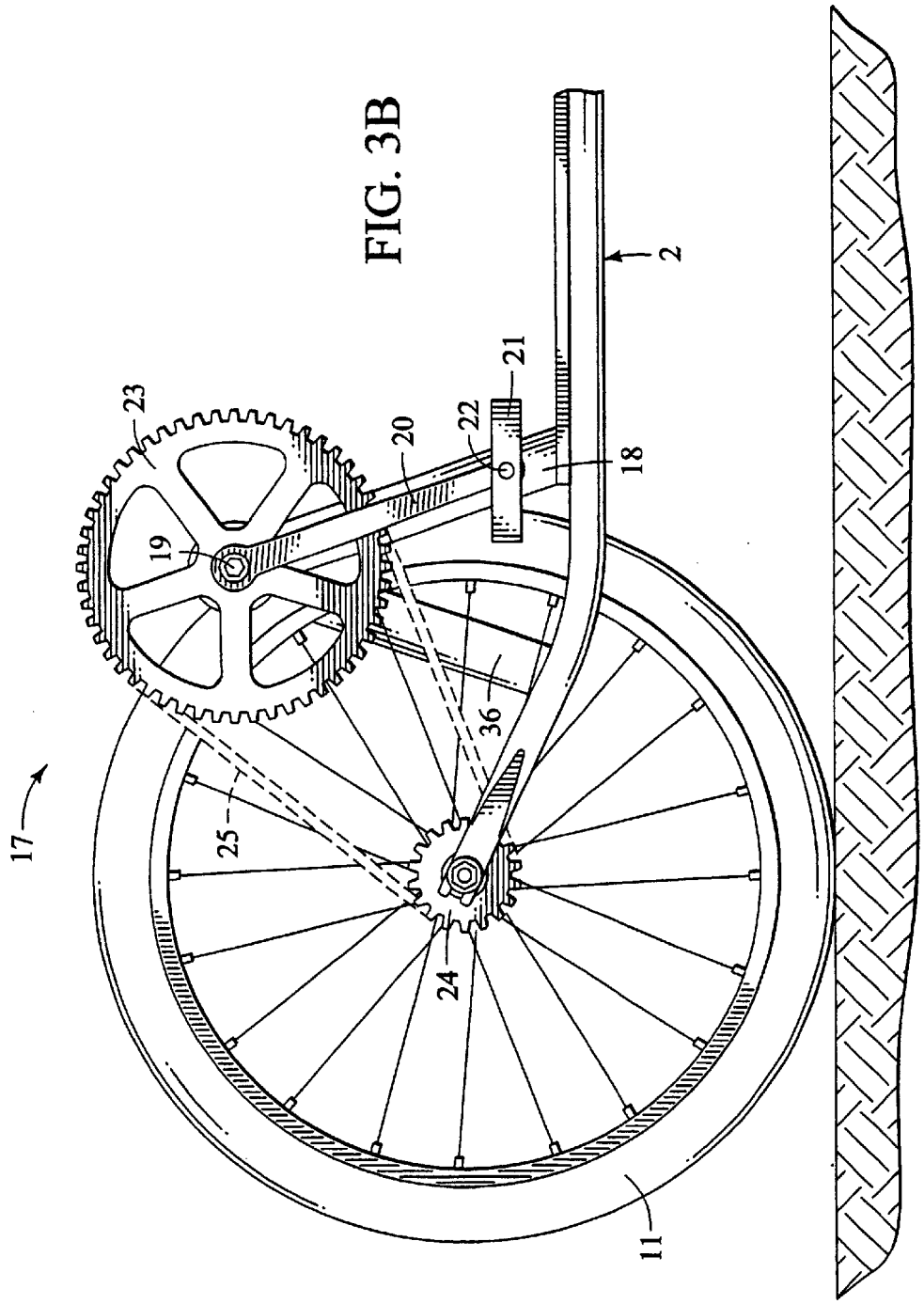

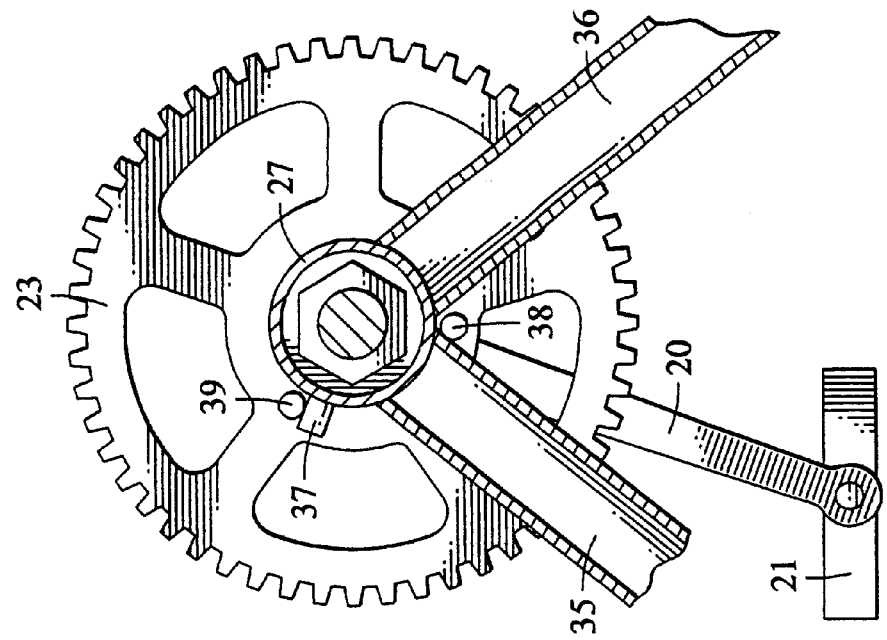
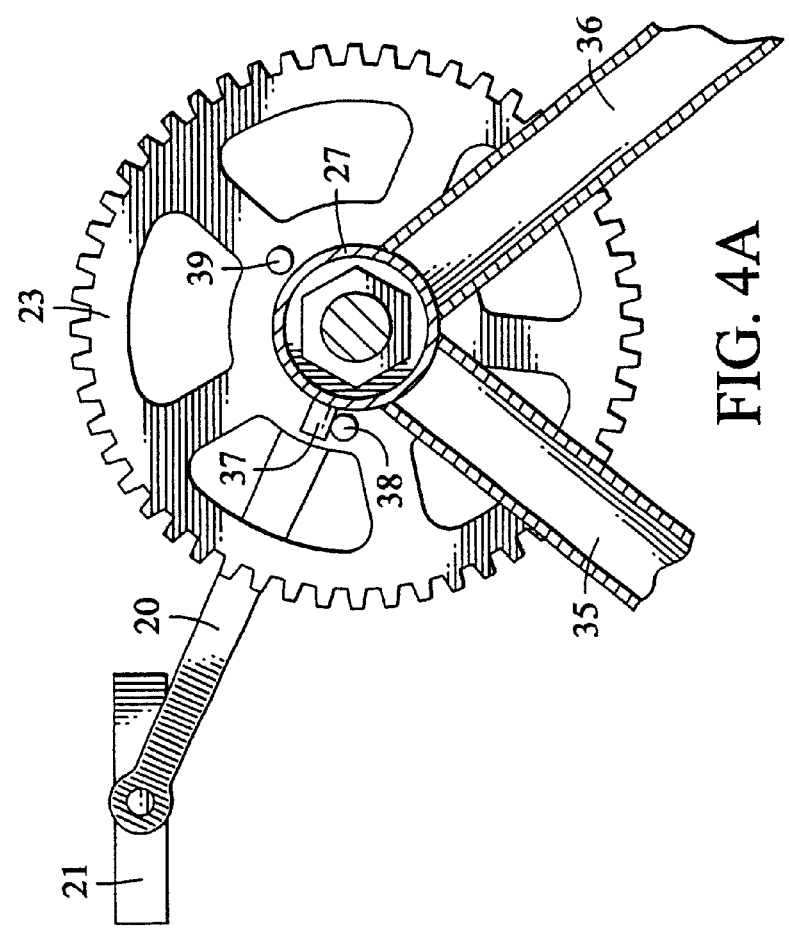
FIG. 4B
FIG. 4A

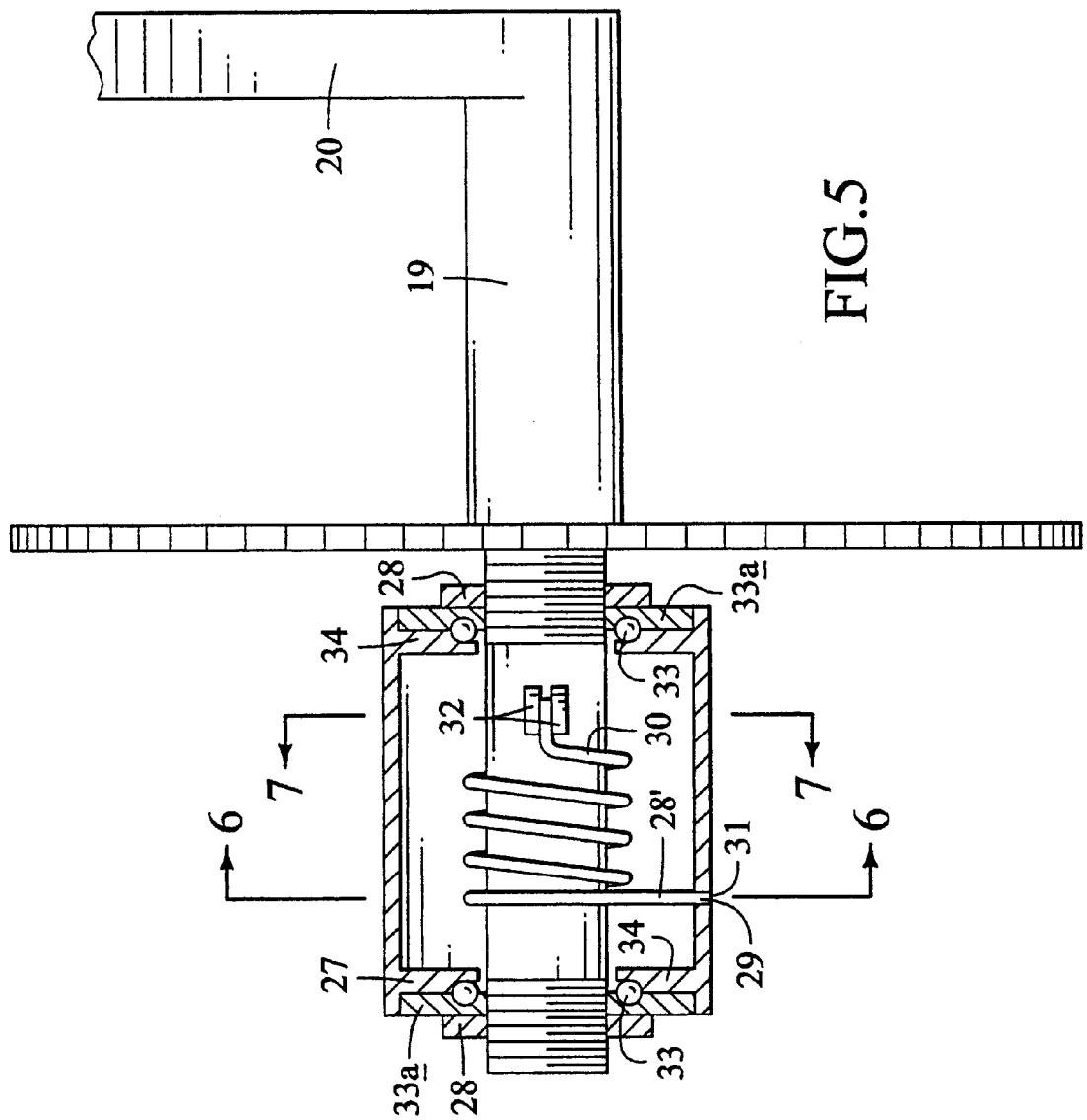

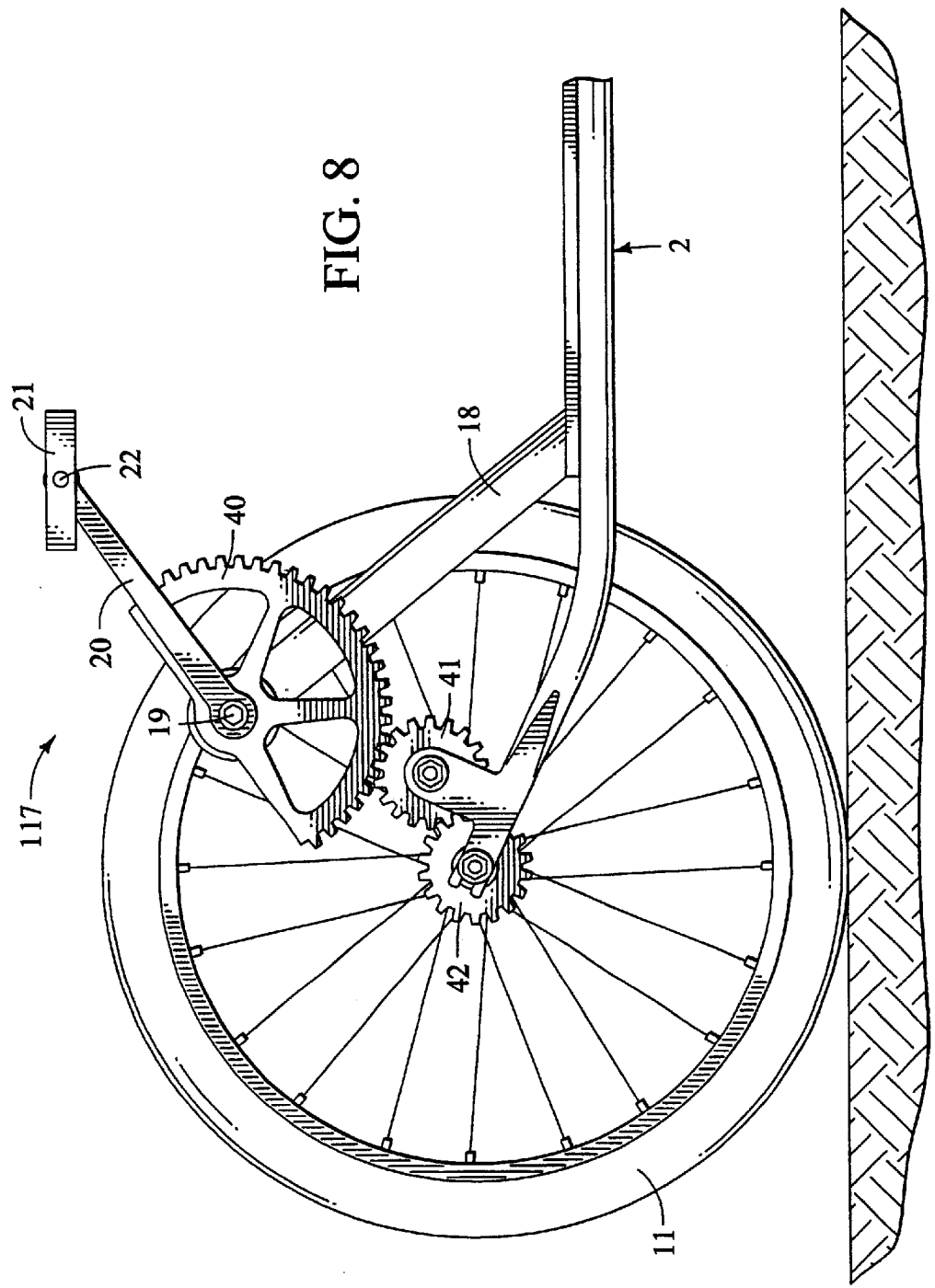

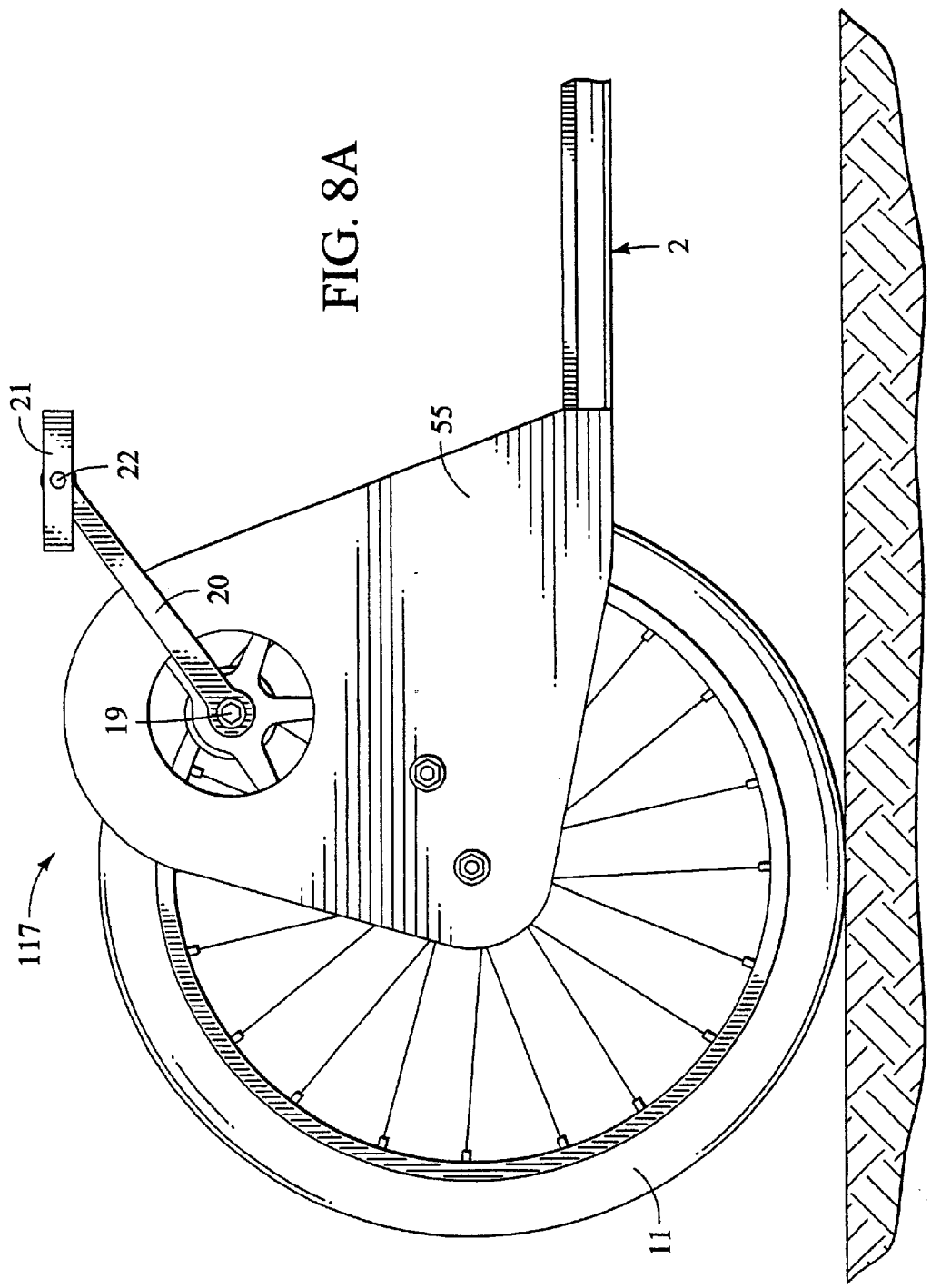

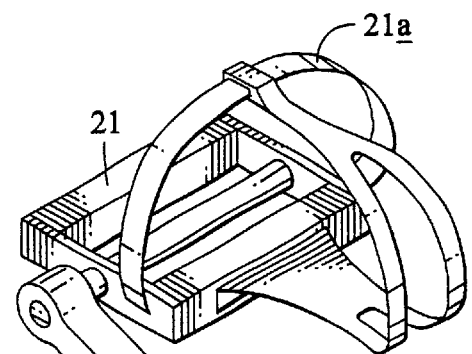
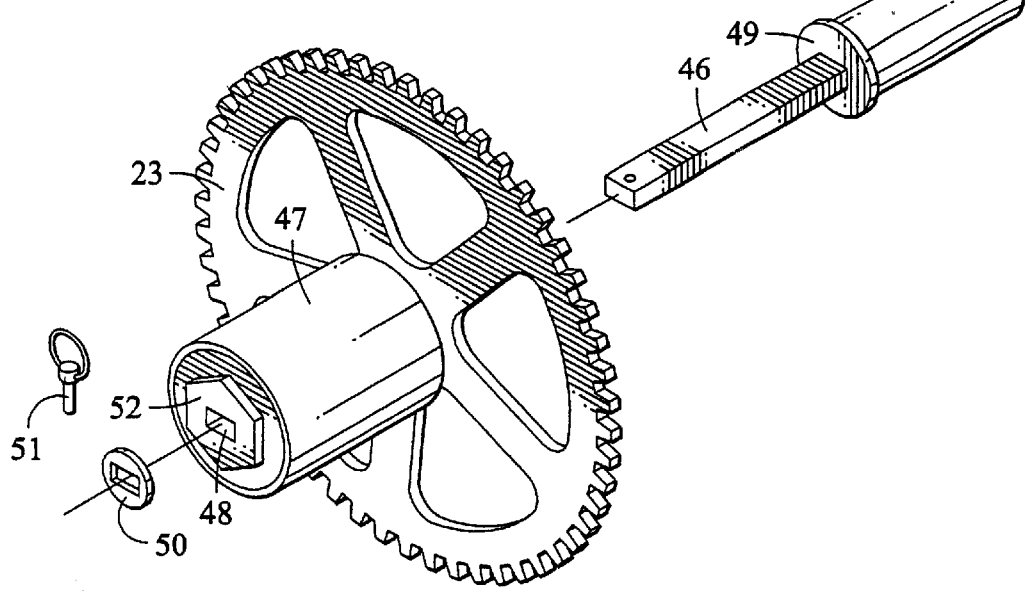
FIG. 10

SCOOTER

This application claims the benefit of U.S. Provisional Application No. 60/301,801, filed Jul. 2, 2001, the contents of which are herein incorporated by reference in its entirety.

BACKGROUND OF THE INVENTION

1. Field of the Invention

The present invention relates to the field of occupant propelled vehicles, and in particular to an occupant propelled scooter and improvements thereto.

2. Description of the Related Art

There are different types of personal vehicles, including vehicles propelled by an occupant. In an occupant propelled vehicle, the occupant, or rider of the vehicle, provides the force to propel the vehicle. Occupant propelled vehicles include, for example, bicycles and scooters.

The prior art includes scooters, as disclosed, for example, by U.S. Pat. No. 4,761,014 to HUANG. The occupant propelled scooter of HUANG includes a frame with handlebars, a platform to support a rider, front and rear wheels, and a drive mechanism. The drive mechanism includes a stepping lever and pedal, and a ratchet mechanism including a ratchet wheel, a ratchet pawl and transmission gears for driving the rear wheel. When a rider steps down on the pedal, the ratchet pawl engages the ratchet wheel, driving the transmission gears and the rear wheel. A spring returns the stepping lever to a raised position when the stepping force is released. This motion is repeated so that the pedal reciprocates vertically and the scooter is propelled in a forward direction. The HUANG patent also discloses an embodiment including a ratchet wheel, a ratchet pawl, and belt gearing.

Another example of a ratchet pawl driven scooter is U.S. Pat. No. 1,511,151 to WILSON. The WILSON scooter includes a drive mechanism including a ratchet wheel, a ratchet pawl, drive gears, and a pedal provided on a shaft mounted on the axis of a drive gear to turn therewith. Reciprocation of the pedal turns the drive gears and the ratchet pawl, thus driving the rear wheel. The WILSON scooter also includes a torsion spring mounted around the pedal shaft to restore the pedal to the upward position and to return the ratchet pawl to its starting position.

Also known in the prior art are scooters having a combination ratchet, ratchet pawl and chain drive. An example of a scooter having a combination ratchet, ratchet pawl and chain drive is disclosed by U.S. Pat. No. 2,436,199 to CARTMILL. The CARTMILL scooter includes a frame with handlebars, a platform, a reciprocating pedal, a ratchet wheel, a ratchet pawl, and a chain to drive the rear wheel.

Another example of a chain driven scooter is disclosed by U.S. Pat. No. 4,861,055 to JONES. The chain driven scooter of JONES includes a reciprocating carriage, oscillating gears, ratcheting gears, and a chain to drive the rear wheel. The JONES scooter is operated by reciprocating handlebars.

The prior art also includes occupant propelled vehicles, as disclosed, for example, by the product called KICK 'N GO from Honda Co. This vehicle is a scooter having a frame, handlebars, brakes, a kick pedal, a clutch and a drive train. To propel the vehicle in a forward direction, the rider kicks the kick pedal toward the rear of the vehicle, thereby engaging the clutch and driving the chain and rear wheel. The vehicle further includes a return spring to restore the kick pedal to its upright starting position.

the prior art also includes occupant propelled scooters, as disclosed, for example, by U.S. Pat. No. 6,241,269 to FAN. The scooter of FAN includes a platform, wheels, and a crank drive mechanism. The drive mechanism includes a foot pedal, a crank arm, a gear wheel and spur gears. When the occupant depresses the foot pedal, the crank arm turns the gear wheel and spur gears to drive the rear wheel. A spring raises the foot pedal after the force on the pedal is released. Repeated reciprocation of the foot pedal propels the scooter in a forward direction. The FAN patent discloses embodiments including two or three wheels. The FAN scooter may also include a ratchet mechanism on the driven wheel to allow free movement of the scooter in a rearward direction.

The prior art also includes occupant propelled bicycles, as disclosed, for example, by U.S. Pat. No. 4,657,273 to SLATER. The bicycle of SLATER includes a frame with handlebars, a seat, a front wheel and a rear wheel, and a combination chain and rachet pawl drive mechanism. The combination chain and ratchet pawl drive mechanism includes sprocket gears, a chain provided around one of the sprocket gears, and pedals, wherein each pedal includes a ratchet pawl that drives the sprocket gears. The rider alternatingly steps on the pedals, producing a reciprocating motion to the pedals, to rotate the sprocket gears and drive the chain and the rear wheel, propelling the bicycle in a forward direction.

Also known in the prior art are occupant propelled vehicles including drive mechanisms having arcuate toothed members. An example of an occupant propelled vehicle including a drive mechanism having an arcuate toothed member is U.S. Pat. No. 1,562,553 to HANSEN. The vehicle of HANSEN includes a frame, four wheels, meshing drive gears including an arcuate toothed gear, and a pedal for reciprocating the arcuate toothed member and thereby driving the vehicle.

Other examples of occupant propelled vehicles having meshing gears including an arcuate toothed member are U.S. Pat. No. 4,473,236 to STROUD and U.S. Pat. No. 732,120 to SCHMIDT. The STROUD patent discloses a bicycle including meshing gears driven by reciprocation of two pedals. The SCHMIDT patent discloses a skate-like vehicle driven by the weight of an operator on a foot plate.

The prior art also includes occupant propelled vehicles, as disclosed, for example, by U.S. Pat. No. 2,466,105 to HOFFMAN. The vehicle of HOFFMAN includes a chain drive and a pivoting treadle. The pivoting treadle supports an occupant standing thereon and operates the chain drive to propel the vehicle in a forward direction.

The prior art also includes occupant propelled vehicles, as disclosed, for example, by U.S. Pat. No. 3,659,871 to HOTT. The vehicle of HOTT includes optional and removable accessories, such as, for example, a seat and a basket for carrying articles.

Also known in the prior art are vehicles as disclosed, for example, by U.S. Pat. No. 6,012,539 to PATMONT. The PATMONT vehicle is an all terrain scooter having a large chassis and tires.

Also known in the prior art are vehicles as disclosed, for example, by U.S. Pat. No. 5,816,597 to TSAI (disclosing a scooter having four wheels and two pedals which reciprocate together to drive the scooter in forward direction); U.S. Pat. No. 5,816,592 to HORTON et al. (disclosing a multiplaned scooter having a plurality of pairs of wheels); and U.S. Pat. No. 3,945,453 to BLACK (disclosing a three wheeled scooter having a spring drive).

SUMMARY OF THE INVENTION

The present invention is directed to an occupant propelled vehicle which overcomes problems existing in the prior art discussed above.

An aspect of the present invention provides an occupant propelled vehicle including a frame, the frame including a front portion and a rear portion, a front wheel provided on the front portion of the frame, a rear wheel provided on the rear portion of the frame, and a platform for supporting an occupant. The platform is provided between the front and rear portions on the frame. A steering mechanism and an oscillating drive mechanism are provided on the frame.

A further aspect of the present invention provides an occupant propelled vehicle including a frame, the frame including a front portion and a rear portion, a front wheel provided on the front portion of the frame, a rear wheel provided on the rear portion of the frame, a platform for supporting an occupant, the platform provided between the front and rear portions on the frame, a steering mechanism provided on the frame, and a drive mechanism. The drive mechanism includes a drive sprocket mounted on the rear portion of the frame, the drive sprocket having a central axis and an axle therethrough and being rotatable with the axle, a driven sprocket provided coaxially with the rear wheel and rotatable therewith, a pedal crank arm, the pedal crank arm having a first end provided on the drive sprocket axle and a second end having a pedal attached thereto, and an endless chain drivingly provided around the drive sprocket and the driven sprocket, wherein downward force on the pedal and the crank arm rotates the drive sprocket, which drives the driven sprocket and the rear wheel therewith and propels the occupant propelled vehicle in a forward direction.

According to a further aspect of the present invention, the occupant propelled vehicle may further include a stationary stop provided on the rear portion of the frame, adjacent the drive sprocket, a front stop provided on the drive sprocket, and a rear stop provided on the drive sprocket, wherein the stationary, front and rear stops interact and prevent full rotation of the drive sprocket so that the occupant propelled vehicle is propelled in a forward direction by oscillation of the drive sprocket between positions of the front and rear stops.

In a further aspect of the present invention, the pedal may be provided on a first side of the drive sprocket, the front stop may be provided in a first position on a second side of the drive sprocket, and the rear stop may be provided in a second position on the second side of the drive sprocket, so that the drive sprocket oscillates between a first position in which the rear stop engages the stationary stop and a second position in which the front stop engages the stationary stop.

According to a further aspect of the present invention, the drive sprocket may oscillate over an arc of between 90°–100°. The drive sprocket of the present invention may oscillate over an arc up to 220°.

In still another aspect of the present invention, the front and rear stops may be positioned on a side of the drive sprocket between 90°–100° apart. The front and rear stops may be positioned on a side of the drive sprocket 220° apart.

In a further aspect of the present invention, the occupant propelled vehicle may further include a crank housing provided on the frame, a torsion spring provided in the crank housing, the torsion spring including a first end connected to the crank housing, and a second end connected to and movable with the drive sprocket axle, wherein the oscillation of the drive sprocket tightens and loosens the torsion spring so that downward force on the pedal by an occupant rotates the drive sprocket until the rear stop abuts the stationary stop, and the return force of the torsion spring rotates the drive sprocket in an opposite direction until the front stop abuts the stationary stop. The stationary stop may further be provided on an outer surface of the crank housing.

According to a further aspect of the present invention, the drive sprocket may be mounted on the frame in a position forward of the driven sprocket. The drive sprocket may further be mounted on the frame in a position above the driven sprocket. The drive sprocket may further be mounted on the frame in a position rearward of the driven sprocket.

In a still further aspect of the present invention, the pedal crank arm may include a linear member. The pedal crank arm may further include an angled member.

According to a further aspect of the present invention, the occupant propelled vehicle may further include an extension spring, the extension spring including a first end connected to the frame, and a second end connected to and movable with the drive sprocket, wherein the oscillation of the drive sprocket extends and retracts the extension spring so that downward force on the pedal by an occupant rotates the drive sprocket until the rear stop abuts the stationary stop, and the return force of the extension spring rotates the drive sprocket in an opposite direction until the front stop abuts the stationary stop. The extension spring of the present invention may be pivotally mounted to the frame.

In a further aspect of the present invention, the occupant propelled vehicle may further include a compression spring, the compression spring including a first end connected to the frame, and a second end connected to and movable with the drive sprocket, wherein the oscillation of the drive sprocket compresses and relaxes the compression spring so that downward force on the pedal by an occupant rotates the drive sprocket until the rear stop abuts the stationary stop, and the return force of the compression spring rotates the drive sprocket in an opposite direction until the front stop abuts the stationary stop. The compression spring of the present invention may be pivotally mounted to the frame.

A further aspect of the present invention provides an occupant propelled vehicle including a frame, the frame including a front portion and a rear portion, a front wheel provided on the front portion of the frame, a rear wheel provided on the rear portion of the frame, a platform for supporting an occupant, the platform provided between the front and rear portions on the frame, a steering mechanism provided on the frame, and a drive mechanism. The drive mechanism includes a drive gear mounted on the frame, the drive gear having a central axis and an axle therethrough and being rotatable with the axle, a driven gear mounted coaxially with the rear wheel and movable therewith, a pedal crank arm, the pedal crank arm having a first end provided on the drive gear axle, and a second end having a pedal attached thereto, and an intermediate gear drivingly provided between the drive gear and the driven gear, wherein downward force on the pedal and the crank arm rotate the drive gear, which drives the driven gear and the rear wheel therewith, and propels the occupant propelled vehicle in a forward direction. The drive gear of the present invention may include a sector gear.

A still further aspect of the present invention provides an occupant propelled vehicle including a frame, the frame including a front portion and a rear portion, a front wheel provided on the front portion of the frame, a rear wheel provided on the rear portion of the frame, a platform for supporting an occupant, the platform provided between the front and rear portions on the frame, a steering mechanism provided on the frame, and a drive mechanism. The drive mechanism includes a drive gear mounted on the frame, the drive gear having a central axis and an axle therethrough and being rotatable with the axle, a driven gear mounted coaxially with the rear wheel and movable therewith, the driven gear drivingly connected to the drive gear, and a pedal crank arm, the pedal crank arm having a first end provided on the drive gear, and a second end having a pedal attached thereto, wherein downward force on the pedal and the crank arm rotate the drive gear, which drives the driven gear and the rear wheel therewith, and propels the occupant propelled vehicle in a forward direction. The drive gear of the present invention may include internal teeth. The pedal crank arm of the present invention may include a telescoping portion.

BRIEF DESCRIPTION OF THE DRAWINGS

The above and other objects, features and advantages of the present invention will be made apparent from the following description of the preferred embodiments, given as nonlimiting examples, with reference to the accompanying drawings in which:

FIG. 3B is an enlarged left side view of the invention with a portion of the vehicle cut away, depicting the drive mechanism in a second position, according to the embodiment of FIG. 1;

FIG. 4A is an enlarged right side view of the invention with a portion of the vehicle cut away, depicting the drive mechanism in the first position, according to the embodiment of FIG. 1;

FIG. 4B is an enlarged right side view of the invention with a portion of the vehicle cut away, depicting the drive mechanism in the second position, according to the embodiment of FIG. 1;

FIG. 5 is an enlarged top view of the invention with a portion of the vehicle cut away, depicting a spring mechanism, according to the embodiment of FIG. 1;

FIG. 8 is an enlarged left side view of the invention with a portion of the vehicle cut away, depicting a drive mechanism in a first position, according to a second embodiment of the present invention;

FIG. 8A is an enlarged left side view of the invention with a portion of the vehicle cut away, depicting a drive mechanism in a first position, according to a further embodiment of the present invention;

FIG. 10 is an exploded, perspective view of a quick change system of a vehicle, according to a third embodiment of the present invention;

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
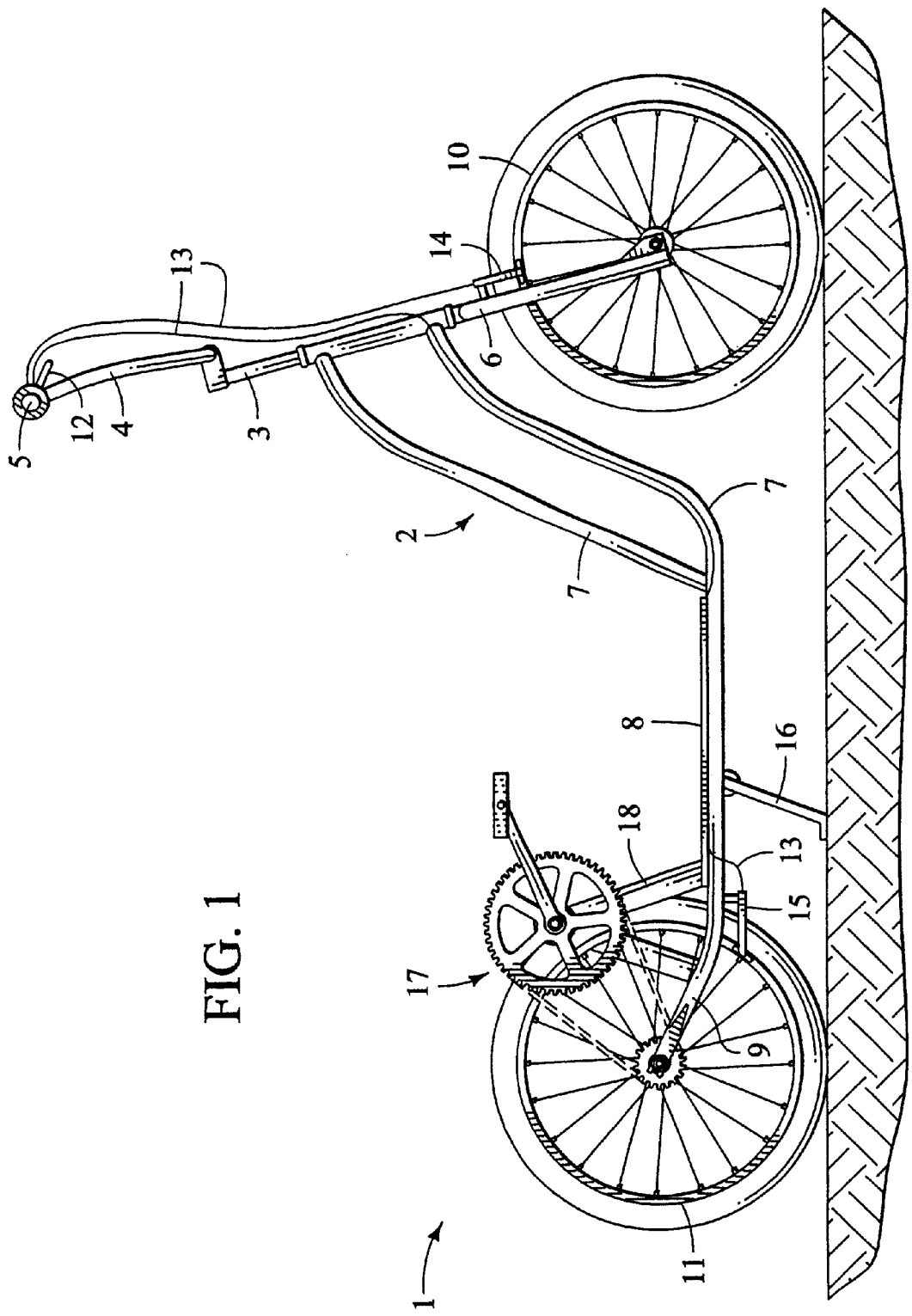
FIG. 1 is a left side view of a vehicle, according to an embodiment of the present invention.
Figure 2:
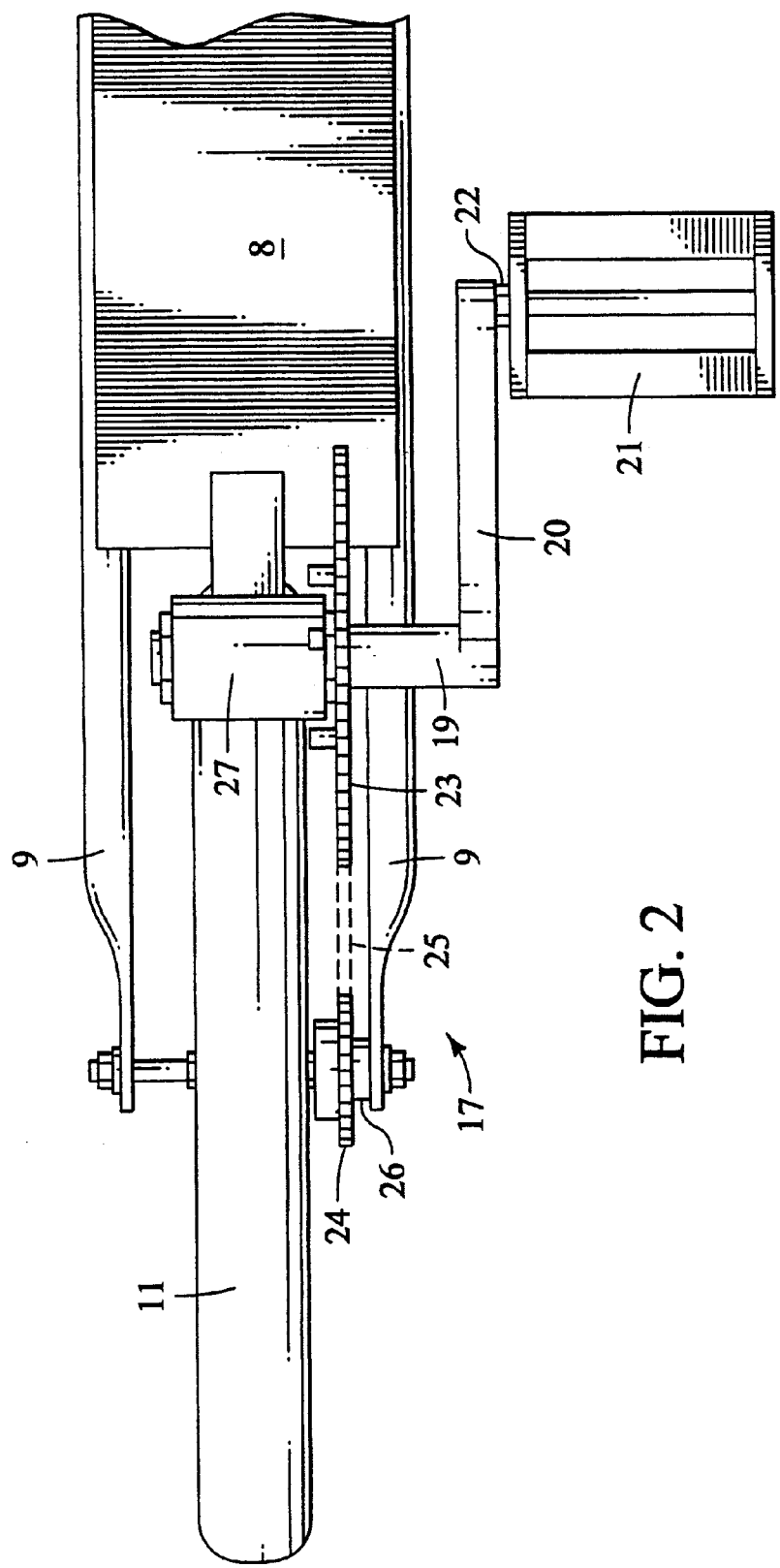
FIG. 2 is an enlarged top view of the invention with a portion of the vehicle cut away, depicting a drive mechanism, according to the embodiment of FIG. 1.

With reference to FIG. 1 of the drawings, reference numeral 1 denotes an embodiment of the occupant propelled vehicle of the present invention. The vehicle 1 is supported by a frame 2. The frame 2 includes a steering column 3 and handlebars 4 supported by the steering column 3. There may be hand grips 5 on the handlebars 4. The frame 2 further includes a front fork 6, a plurality of support rods 7, a platform 8 to support the occupant, and a rear fork 9. The vehicle 1 further includes a front wheel 10 mounted on the front fork 6 and a rear wheel 11 mounted on the rear fork 9.

The vehicle 1 may further include a braking apparatus. The braking apparatus may include a brake actuator handle 12 provided adjacent to each of the hand grips 5, brake lines 13, and front and rear brake calipers 14, 15. The braking apparatus is configured so that one of the brake actuator handles 12 operates the front brake caliper 14 and the other of the brake actuator handles 12 operates the rear brake caliper 15.

The vehicle 1 of the present invention may further include a kickstand 16.

The vehicle 1 of the present invention further includes a drive mechanism 17 to propel the vehicle 1. Although the drive mechanism 17 of the present invention is shown in the drawings on the right side of the vehicle 1, the drive mechanism 17 may be provided on the left side of the vehicle 1, in a mirror image.

A first embodiment of a drive mechanism 17 of the present invention is shown in FIGS. 1–4 of the drawings. The drive mechanism 17 of the first embodiment includes a support shaft 18, an axle 19 provided on the support shaft 18, a crank or pedal lever 20 mounted on the axle 19, and a pedal 21. The pedal 21 may be mounted on the pedal lever 20 by a device of positive retention, such as, for example, a pin 22, so that the pedal is freely rotatable. The drive mechanism 17 further includes a large sprocket 23 mounted on the axle 19, and a smaller sprocket 24 mounted on the axle of the rear wheel 11. The large sprocket 23 and the smaller sprocket 24 are drivingly connected by an endless driving device that engages the teeth of the sprockets 23, 24. The present invention may include any suitable type of endless driving device such as a chain or belt, and in the present embodiment includes an endless chain 25. A ratcheting mechanism 26 is provided on the hub of the rear wheel 11. The pedal lever 20 is fixed with respect to the large sprocket 23 so that the large sprocket 23 turns with the pedal lever 20. Further, rotation of the large sprocket 23 turns the endless chain 25, which turns the smaller sprocket 24, and the rear wheel 11 therewith.

Alternatively, a ratcheting mechanism may be provided at the front of the drive mechanism 17, adjacent the large sprocket 23.

Figure 7:
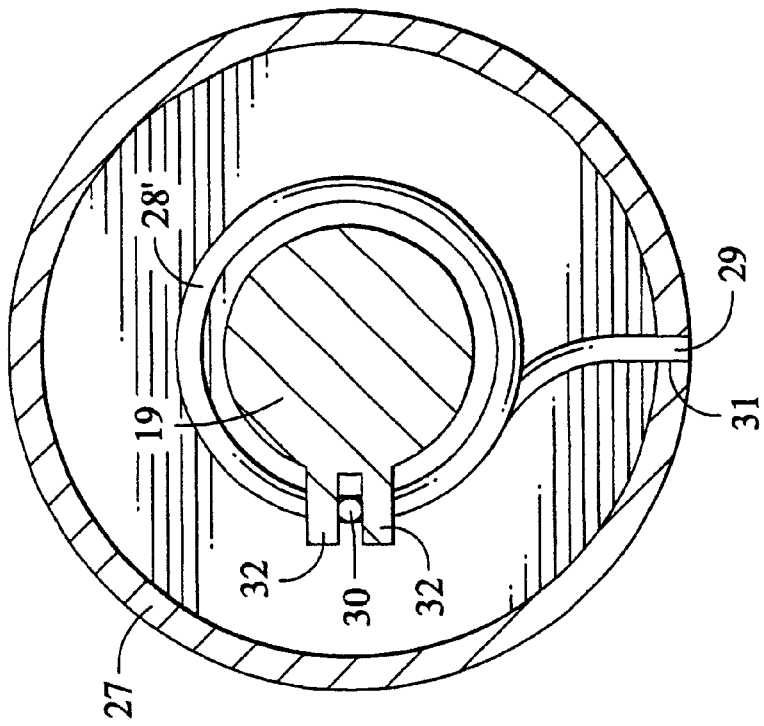
FIG. 7 is a cross sectional view taken at line 7—7 in FIG. 5 of the spring mechanism, according to the embodiment of FIG. 1.
Figure 6:
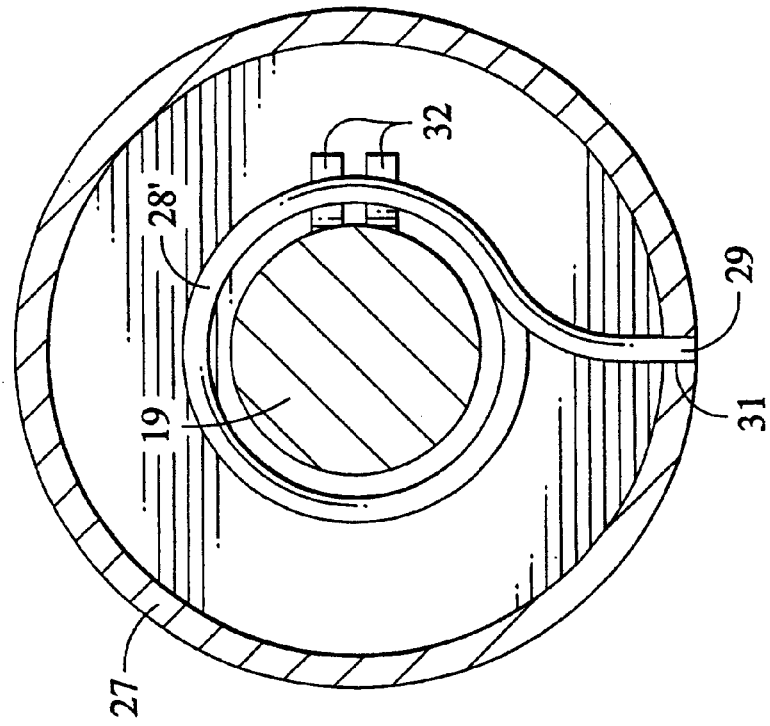
FIG. 6 is a cross sectional view taken at line 6—6 in FIG. 5 of the spring mechanism, according to the embodiment of FIG. 1.

As shown more particularly in FIGS. 5–7, the drive mechanism 17 may further include a crank housing 27 surrounding the axle 19. The crank housing 27 is mounted on the crank 20 with jam nuts 28. The crank housing 27 may include gussets 27a extending therefrom and to the frame 2 (shown in FIG. 17). Inside the crank housing 27, there is provided a torsion spring 28' including a coiled portion having a center through which the axle 19 passes. The torsion spring 28' includes a housing end 29 and a crank end 30. The housing end 29 of the torsion spring 28' is received in a hole 31 in the crank housing 27. The crank end 30 of the torsion spring 28' is received between spring restraining elements 32. Also provided in the crank housing 27 are caged ball bearings 33, adjustable bearing races 33a, and bearing seats 34. As shown most particularly in FIGS. 4A and 4B, the drive mechanism 17 may further include a support shaft 35 and a support plate 36 (support shaft 18 is hidden behind support shaft 35 in FIGS. 4A and 4B). The torsion spring 28' returns the pedal 21 to the up position from the down position, setting the pedal 21 to the start position for the next down stroke. This action further ensures that the pedal 21 follows or stays in contact with the bottom of the operator's foot during the up stroke of the pedal. A spring adjustment device may be included to allow for tension adjustment throughout the life of the spring to compensate for spring weakening or friction changes that may occur between drive system components over time, and to adjust the return speed of the pedal to a rate that is comfortable to the operator.

Alternatively, the crank end 30 of the torsion spring 28' may be mounted in a hole (not shown) in the axle 19, rather than between spring retaining elements 32. The hole may be, for example, ¼" deep. Such a hole may facilitate crank disassembly.

Alternatively, the pedal return spring system may be eliminated to reduce unnecessary weight (such as in a racing environment), and a system comprised of a Velcro™ (book and loop fastener) strap attachment may be included to secure the pedal to the operator's foot. The strap holds the operator's foot on the pedal, so that the operator supplies the force to return the pedal 21 to the start position by lifting the pedaling foot. A female snap may be applied to the bottom of the pedal and a male snap may be fastened to a side of the pedal, and may be of the type to break away during a fall or when the operator wants to stop and dismount. Simply rolling the foot on the outboard side of the foot supplies the force to disconnect the snaps and allow the operator to use the drive foot to dismount when stopping. Further, pulling the drive leg and foot to the top of the stroke would also supply enough force to separate the foot from the pedal when the stroke stop components make contact. This system has a reduced number of components, and reduced weight and production cost for the system. Further, the snap system may be located at the farthest, most advantageous point from the pivot point of the pedal crank system, requiring less force to return the pedal to the top of the power stroke. In this system, muscle power is used to overcome gravity and friction to return the pedal to the top of the power stroke, instead of springs.

As shown particularly in FIGS. 4A and 4B, the drive mechanism 17 may further include a stationary stop 37 provided on the outside of the crank housing 27, a front stop 38 mounted on the large sprocket 23 and a rear stop 39 mounted on the large sprocket 23. The interaction of the stationary stop 37 with the front and rear stops 38, 39 prevents the large sprocket 23 from going through a complete revolution. Thereby, the pedal 21 and pedal crank 20 produce reciprocating rotation of the large sprocket 23. The front and rear stops 38, 39 may be placed so that the device is capable of a 90°–100° arc of stroke, or the front and rear stops 38, 39 may be placed so that the device is capable of up to a 220° arc of stroke. Thus, the pedal crank mechanism is similar to the type found on a bicycle, but differs in that a bicycle pedal crank mechanism utilizes a 360° stroke, while the drive mechanism 17 of the present invention utilizes a stroke of less than 360°. The stop system determines the top and bottom of the stroke and prevents the torsion spring 28' from exceeding its travel limits.

Figure 3A:
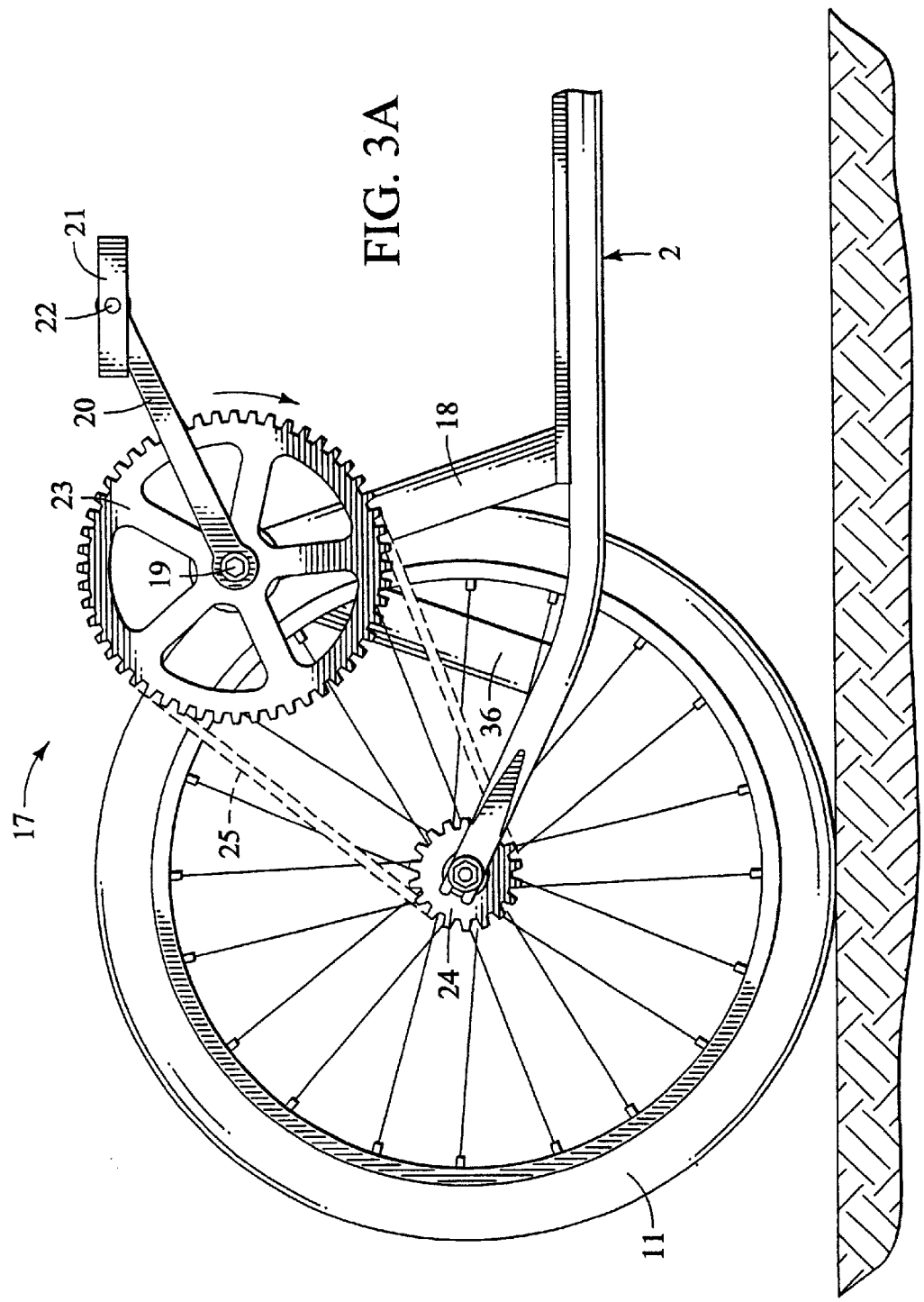
FIG. 3A is an enlarged left side view of the invention with a portion of the vehicle; cut away, depicting the drive mechanism in a first position, according to the embodiment of FIG. 1.

During operation of the above described embodiment of the occupant propelled vehicle, the pedal 21 and large sprocket 23 oscillate between the front and rear stops, driving the chain 25, small sprocket 24 and rear wheel 11 to propel the vehicle forward. To begin riding, an operator may mount the vehicle 1 by stepping on the pedal 21 with one foot (the right foot in this embodiment) and pushing the pedal 21 to the lower position, shown in FIG. 3B. Then the operator may push off the road surface with the other foot (the left foot in this embodiment) to start movement of the vehicle. Once the vehicle 1 is moving forward and balanced upright, the rider may place the left foot on the platform 8 to support himself. Once supported and balanced on the platform 8 with the left foot, the operator may lift his right foot, and the pedal 21 will be returned to the upper position (shown in FIG. 3A) by the force of the torsion spring 28'. When the pedal 21 reaches the upper position, the operator pushes downwardly with his right foot, moving the pedal 21 downwardly, and the large sprocket 23 turns therewith in a clockwise direction, as seen in FIG. 3A. This downward movement of the pedal 21 is the power stroke that drives the chain 25, smaller sprocket 24, and rear wheel 11, and propels the vehicle 1 forward. The pedal 21 continues moving downwardly until such movement is stopped by contact of the rear stop 39 with the stationary stop 37. The large sprocket 23 and pedal 21 have moved approximately 90°–100°, or up to 220°. This position is shown most particularly in FIG. 4B. The downward movement of the pedal 21 and the turning of the crank 20 and axle 19 work against the torsion spring 28, tightening the spring and storing potential energy. When the pedal 21 has reached its lower limit position as determined by the rear stop 39, the rider releases the force on the pedal 21, and allows his foot to rise. With this release of force, the torsion spring 28' is also released, along with the stored potential energy. The torsion spring 28' returns to its unstressed position and turns the axle 19 and crank 20 in the counterclockwise direction and moves the pedal 21 upwardly to its starting position, to the point where the front stop 38 contacts the stationary stop 37 and stops any further movement of the large sprocket 23. This position is most particularly shown in FIG. 4A. The sprockets 23, 24 and chain 25 are permitted to move in the counterclockwise direction (as seen in FIG. 3) without driving the vehicle 1 backward due to the ratcheting sprocket 26 on the rear wheel 11. This action, of reciprocating the pedal 23, is repeated to propel to the vehicle 1 in a forward direction.

Alternatively, an operator may begin riding the vehicle 1 by placing the left foot on the platform 8 and pushing off with the right foot until the operator and vehicle 1 are moving and balanced. Then, the operator may place the right foot on the pedal 21 (which is in the upper position due to the torsion spring 28') and push down therewith to drive the rear wheel 11 and propel the vehicle 1 forward.

In another embodiment of the invention, the pedal 21 may include a stirrup or strap 21a, as shown in FIG. 10. The stirrup or strap 21a may be attached at its ends to the pedal 21, providing a space for an operator's foot. The stirrup or strap 21a holds the operator's foot on the pedal 21 during the upstroke. The stirrup or strap 21a may be provided in addition to the torsion spring 28' and stops 37, 38, 39, or, alternatively, may be provided instead of the torsion spring 28', or the stops 37, 38, 39, or both the torsion spring 28' and the stops 37, 38, 39. Alternatively, the pedal 21 may be provided with a Velcro™ fastener to hold an operator's shoe directly on the pedal 21. A system including a stirrup or strap 21a will be advantageous in racing applications or stunt competition, due to the lower weight obtainable by eliminating the torsion spring 28' and/or the stops 37, 38, 39. The pedal 21 may be attached to the crank 20 from either end of the pedal 21 so that the stirrup or strap 21a will be properly positioned to receive an operator's foot.

An operator also may coast along without propelling himself, such as, for example, to get started, to slow down, or to rest.

The drive mechanism 17 may further include a safety guard, to protect the rider from the moving sprockets 23, 24 and chain 25, and to protect the drive mechanism 17 from damage.

Figure 9:
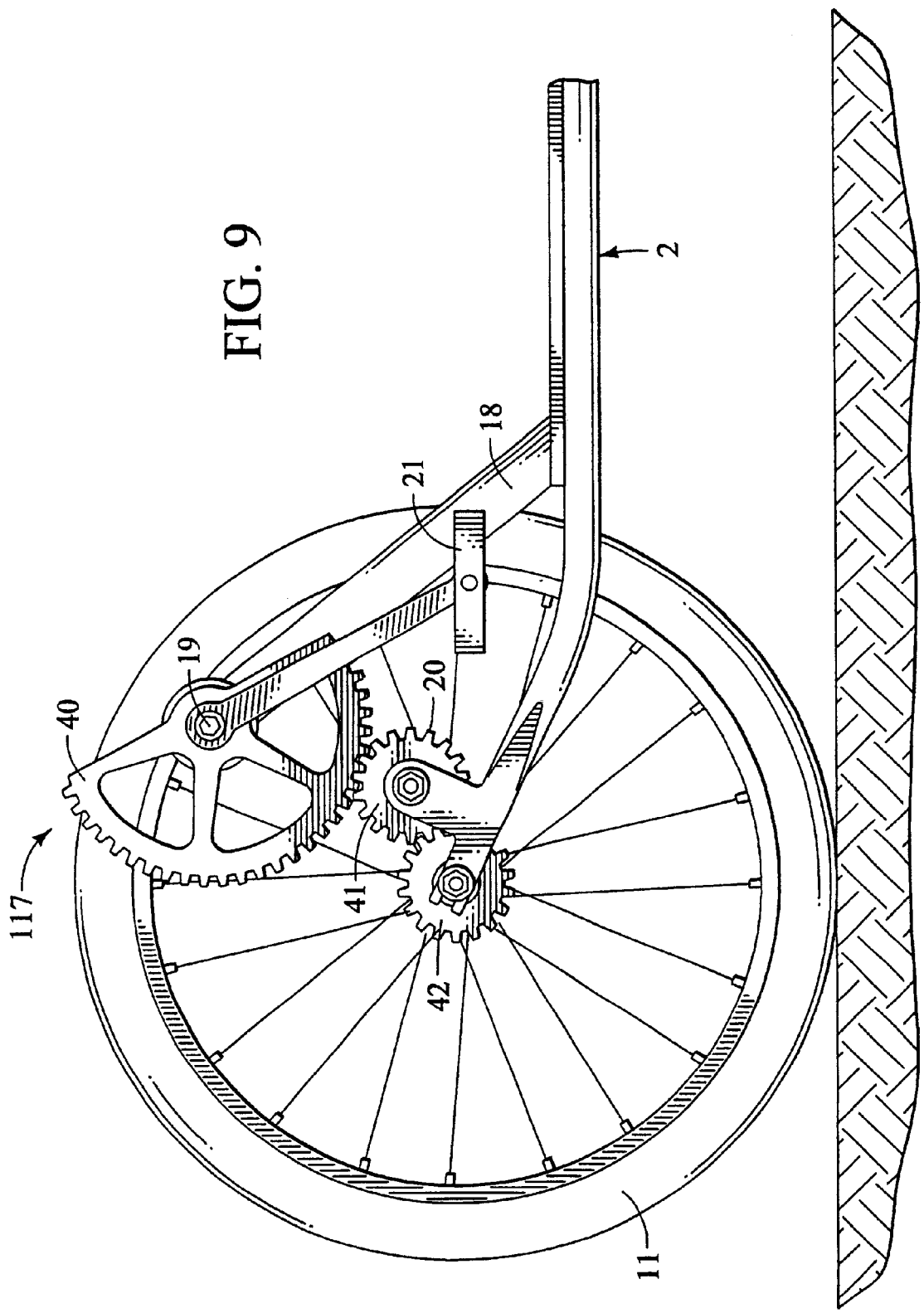
FIG. 9 is an enlarged left side view of the invention with a portion of the vehicle cut away, depicting the drive mechanism in a second position, according to the embodiment of FIG. 8.
Figure 9B:
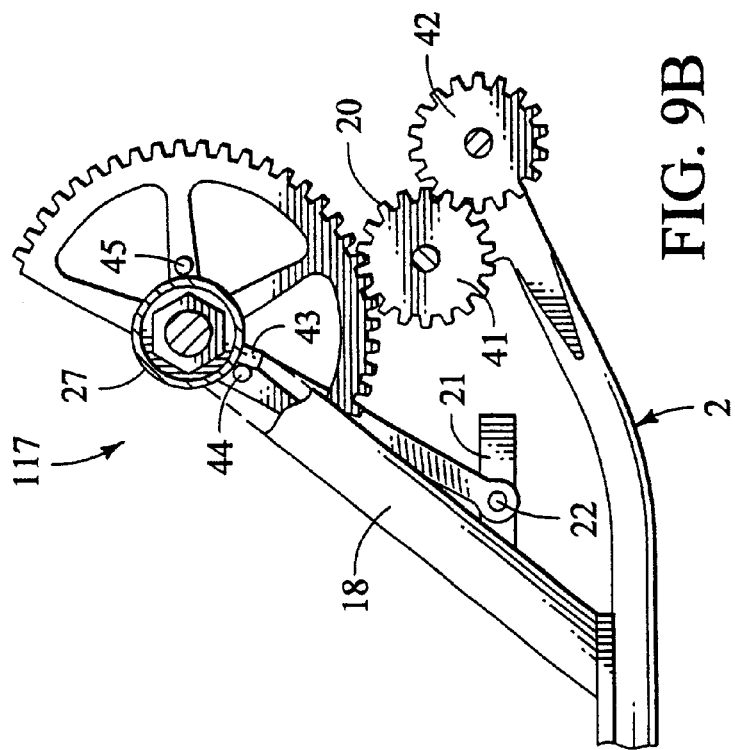
FIG. 9B is an enlarged right side view of the invention with a portion of the vehicle cut away, depicting the drive mechanism in a second position, according to the embodiment of FIG. 8.
Figure 9A:
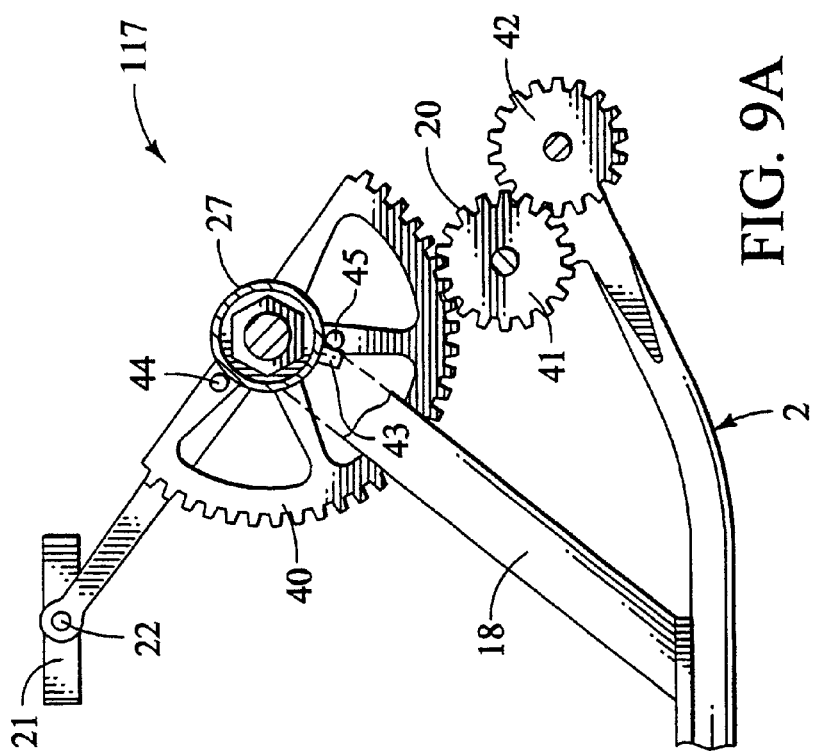
FIG. 9A is an enlarged right side view of the invention with a portion of the vehicle cut away, depicting the drive mechanism in a first position, according to the embodiment of FIG. 8.

A second embodiment of the drive mechanism 117 is shown in FIGS. 8 and 9. The second embodiment of the drive mechanism 117 includes an axle 19, crank or pedal lever 20 and pedal 21 as in the first embodiment. However, the drive mechanism 117 includes arcuate toothed gears rather than a sprocket and chain drive of the first embodiment. The drive mechanism 117 includes an arcuate toothed drive gear 40 having its center at the axle 19. The arcuate toothed drive gear 40 is mounted on the axle 19 to be rotatable therewith with the reciprocation of the pedal 21 on the crank or pedal lever 20. The drive mechanism 117 further includes an idler or intermediate gear 41 and a driven single direction ratcheting gear 42 mounted on the hub of the rear wheel 11. The drive gear 40 may be mounted on a support shaft 18 or mounting plate 55 (shown in FIG. 8A), that is secured to the frame 2. The drive mechanism 117 of the second embodiment may further include a crank housing 27 and a torsion spring 28' as in the first embodiment to return the pedal 21 to its starting position. Further, as shown in FIGS. 9A and 9B, the drive mechanism 117 includes a stationary stop 43 mounted on the crank housing 27, a front stop 44 mounted on the arcuate toothed drive gear 40, and a rear stop 45 mounted on the arcuate toothed drive gear 40. In the second embodiment, the front and rear stops 44, 45 prevent the arcuate toothed drive gear 40 from over rotating, and only allow the gear 40 to rotate through its toothed arc section. This arc may be determined for optimum performance; the stops may be positioned for an arc of 90°–100°, or the stops may be positioned for an arc up to 220°. The second embodiment, including the arcuate toothed drive gear 40, the intermediate gear 41, and the driven gear 42, provides a vehicle having increased power.

The vehicle 1 having the drive mechanism 117 of the second embodiment is operated in a manner similar to that of a vehicle having a drive mechanism 17 as in the first embodiment. An operator may begin by stepping on the pedal 21 and pushing the pedal downwardly to the lower position (shown in FIG. 9). The operator then pushes off with the other foot to start moving. Once the vehicle 1 is moving and balanced, the operator steps on the platform 8. Then, the operator may begin the pumping action of the pedal to oscillate the drive gear 40, drive the rear wheel 11, and propel the vehicle 1 forward. The downward movement of the pedal 21 turns the arcuate toothed drive gear 40, which turns the idler gear 41 and ratcheting gear 42, thereby driving the rear wheel 11. The pedal 21 is pushed until it reaches the lower position (shown in FIGS. 9 and 9B), where the arcuate toothed gear 40 is stopped by the stop 45. In this position, the torsion spring 28' is stressed. The operator then releases his foot and the pedal 21 rises due to the potential energy stored in the torsion spring 28'. The pedal 21 rises until it reaches the upper position (shown in FIGS. 8 and 9A) and the arcuate toothed gear 40 is stopped by the front stop 44. The ratcheting gear 42 allows the arcuate toothed gear 40 to turn counter clockwise and move from the lowest to the highest position without driving the vehicle 1 backwards.

The drive mechanism 117 of the present invention may include gears other than circular gears to optimize or increase performance, such as for example, noncircular, elliptical or eccentric gears.

The particular stroke path experienced by the pedal and the operator's foot in the several embodiments, described above and hereinafter, varies depending on the configuration of the drive system. The power stroke will vary up to a potential stroke of 220°, depending on the leverage factor (i.e., the length of the pedal lever determines the leverage available to the operator). For example, the gear ratio may be 3:1 with a low leverage factor. In such an example, the drive gear pivot point is located in close proximity to the operator's position, and the leverage factor is low due to the short distance between the pedal and the center of the drive gear. This component arrangement has a potential total stroke of 220°. During the power stroke, the pedal and the operator's foot move forward as they move downward until just past the horizontal centerline of the drive gear, at which point they move rearward as they continue downward. This forward and rearward movement is much more pronounced in this component configuration than would be found in the configuration having a significantly higher leverage factor (i.e., with the pedal located a greater distance from the pivot point of the drive gear). For example, an arc of the pedal at a distance of 30 inches from the drive gear pivot point will be substantially longer than the pedal arc on a drive gear having a radius of 12 inches or less.

In a further embodiment of the present invention, shown in FIG. 10, the vehicle 1 may include a quick change system for the pedal 21. In this embodiment, it is possible to quickly and easily attach the pedal lever 20 on either the left or right side of the vehicle 1. This feature allows the operator to choose between left and right side operation, a feature similar to that found in some fishing reels, for example. This embodiment includes a pedal crank shaft 46. This pedal crank shaft 46 may be in the form of a flat shaft cross section and fits into a like-shaped hole 48 in the crank housing 47. The housing 47 includes such a hole 48 in both ends thereof. When the device is configured for right foot pedaling, the crank shaft 46 extends from the right side of the crank housing 47 (the right side of the figure as shown in FIG. 10). When the device is configured for left foot pedaling, the crank shaft 46 and pedal 21 extend from the left side of the crank housing 47 (the left side of the figure as shown in FIG. 10). The crank shaft 46 is fixed and secured to the large sprocket 23 with a shoulder 49, flat washer 50, and linch pin 51. The crank shaft 46 may be secured to either side of the crank housing 47 with these elements in this fashion. The device may further include a spacer 52 for the configuration of left foot pedaling to prevent interference with the crank housing 47. In this embodiment, the pedal 21 may be mounted on the pedal lever 20 by a device of positive retention, such as, for example, a pin 22, so that the pedal is freely rotatable. The mounting of the pedal 21 on the pedal lever 20 is an important safety related detail. Since the pedal 21 may be mounted on either the left or right side of the vehicle 1, the direction that the pedal 21 spins during the stroke may change over the life of the vehicle 1, and neither a left hand nor a right hand threaded member could keep the pedal 21 securely mounted on both sides of the vehicle 1. Therefore, a mounting device that is not effected by the spin direction of the pedal is required.

Figure 11:
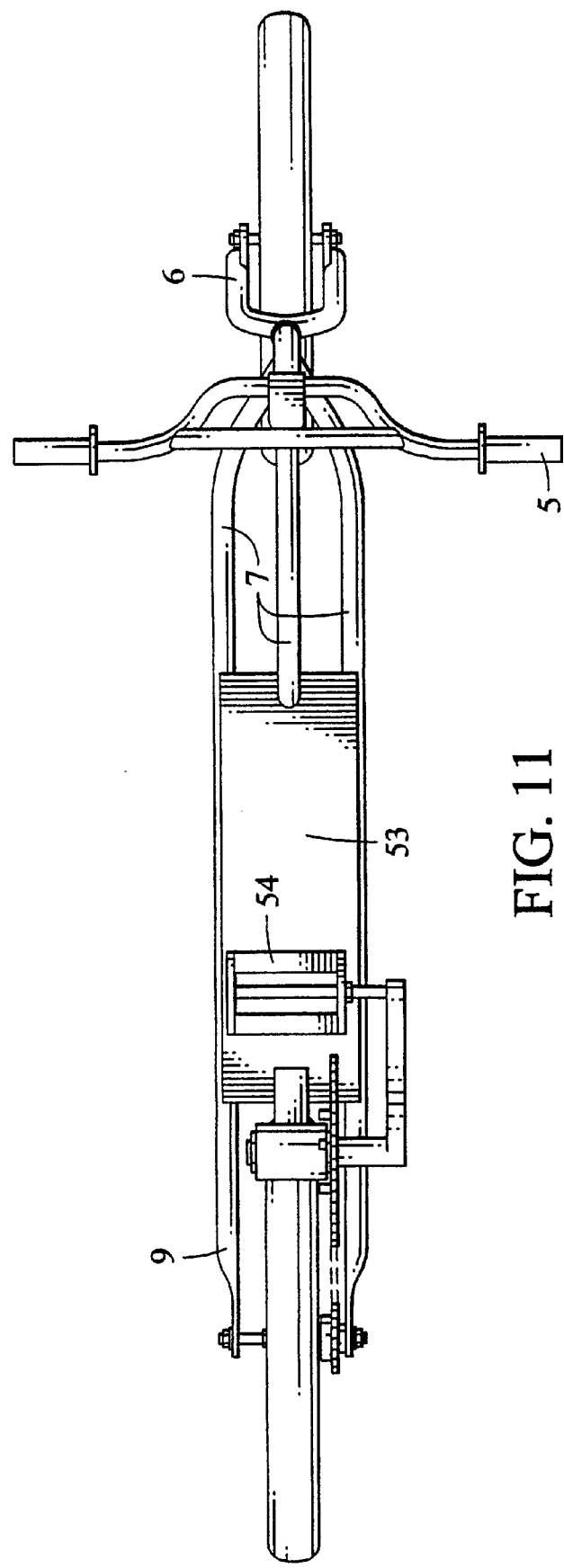
FIG. 11 is a top view of a vehicle, according to a fourth embodiment of the present invention.

In a further embodiment of the present invention, shown in FIG. 11, the drive mechanism may include a long pedal 54 for use by either foot interchangeably. In this embodiment, the frame 2 includes an elongated platform 53. Such an elongated platform 53 may support both of an operator's feet, one in front of the other. Further, in this embodiment, the pedal 54 may be elongated so that the rider may reach backward and operate the pedal 54 with either foot. The pedal 54 may, for example, be extended an amount equal to three pedal crank arm lengths.

Figure 12:
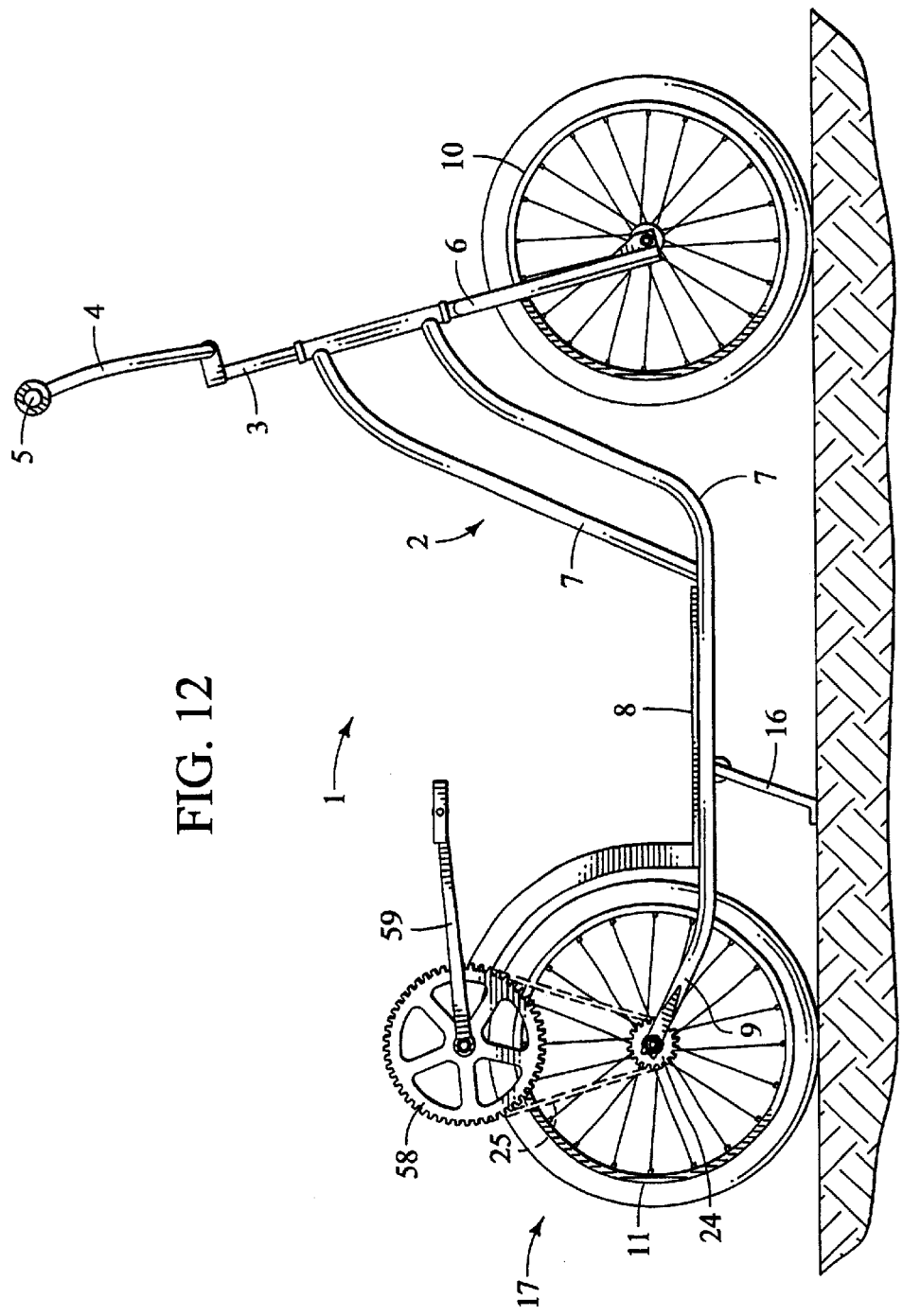
FIG. 12 is left side view of a vehicle depicting a drive mechanism in a first position, according to a fifth embodiment of the present invention.
Figure 13:
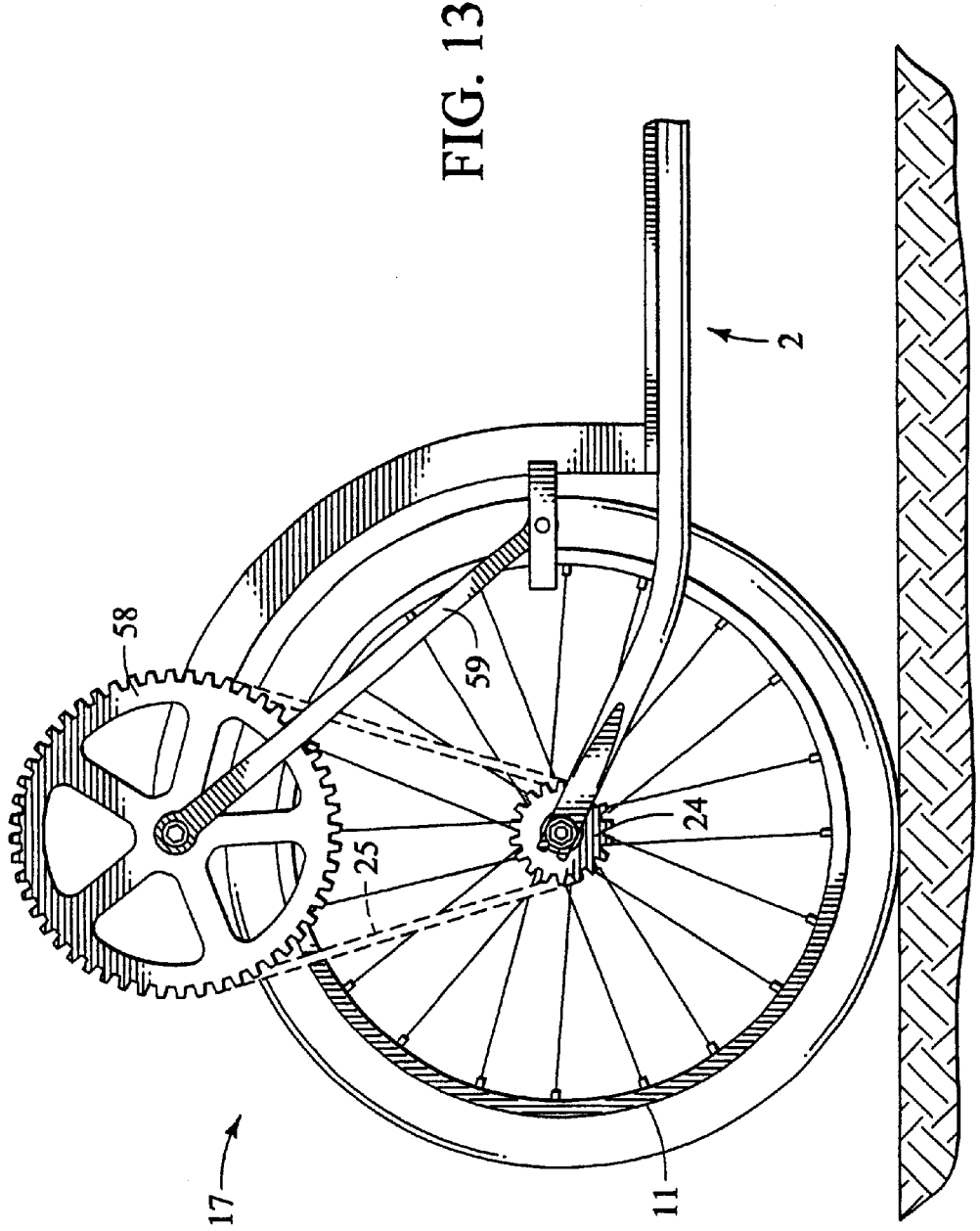
FIG. 13 is an enlarged left side view of the invention with a portion of the vehicle cut away, depicting the drive mechanism in a second position, according to the embodiment of FIG. 12.

In a further embodiment of the present invention, shown in FIGS. 12 and 13, the drive mechanism 17 of the first embodiment may be modified to include a large sprocket 58. The large sprocket 58 drives a small sprocket 24 and the rear wheel 11 via a chain 25. The large sprocket 58 has a greater diameter than the large sprocket 23 of the first embodiment of FIG. 1, and is positioned on the frame 2 substantially on the same vertical centerline as the small sprocket 24 (i.e., rearwardly of the position of the large sprocket 23 of the first embodiment). This embodiment also includes a longer pedal lever 59 than the pedal lever 20 of the first embodiment. The size and position of the large sprocket 58 is possible due to the additional leverage from the longer pedal lever 59. The actual gear ratios and leverage which are possible and optimum on the vehicle of the present invention will vary depending on the application, such as whether the vehicle will be operated by a child or an adult. Small children and adults will have different available input forces.

Figure 14:
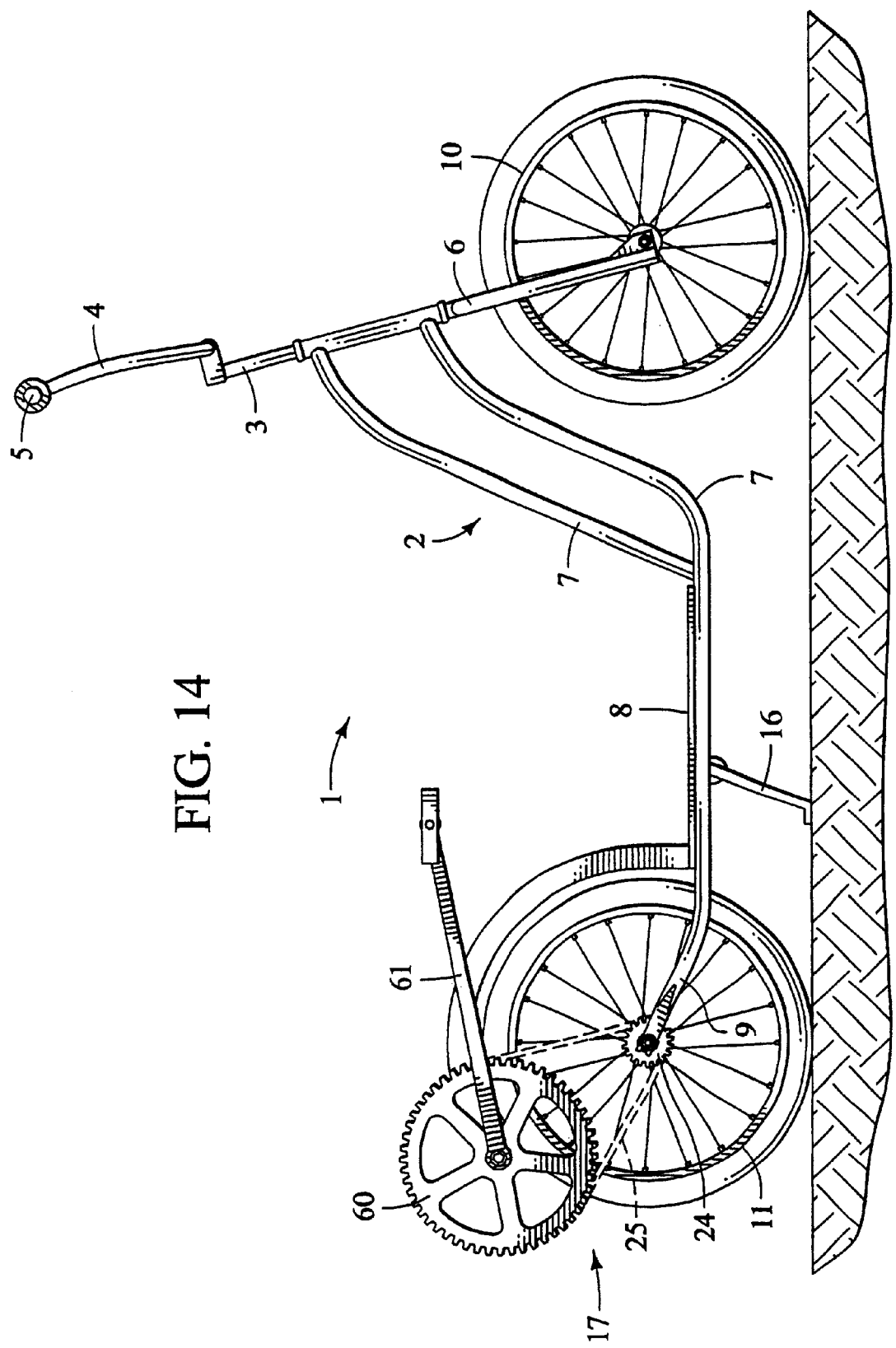
FIG. 14 is a left side view of a vehicle depicting a drive mechanism in a first position, according to a sixth embodiment of the present invention.
Figure 15:
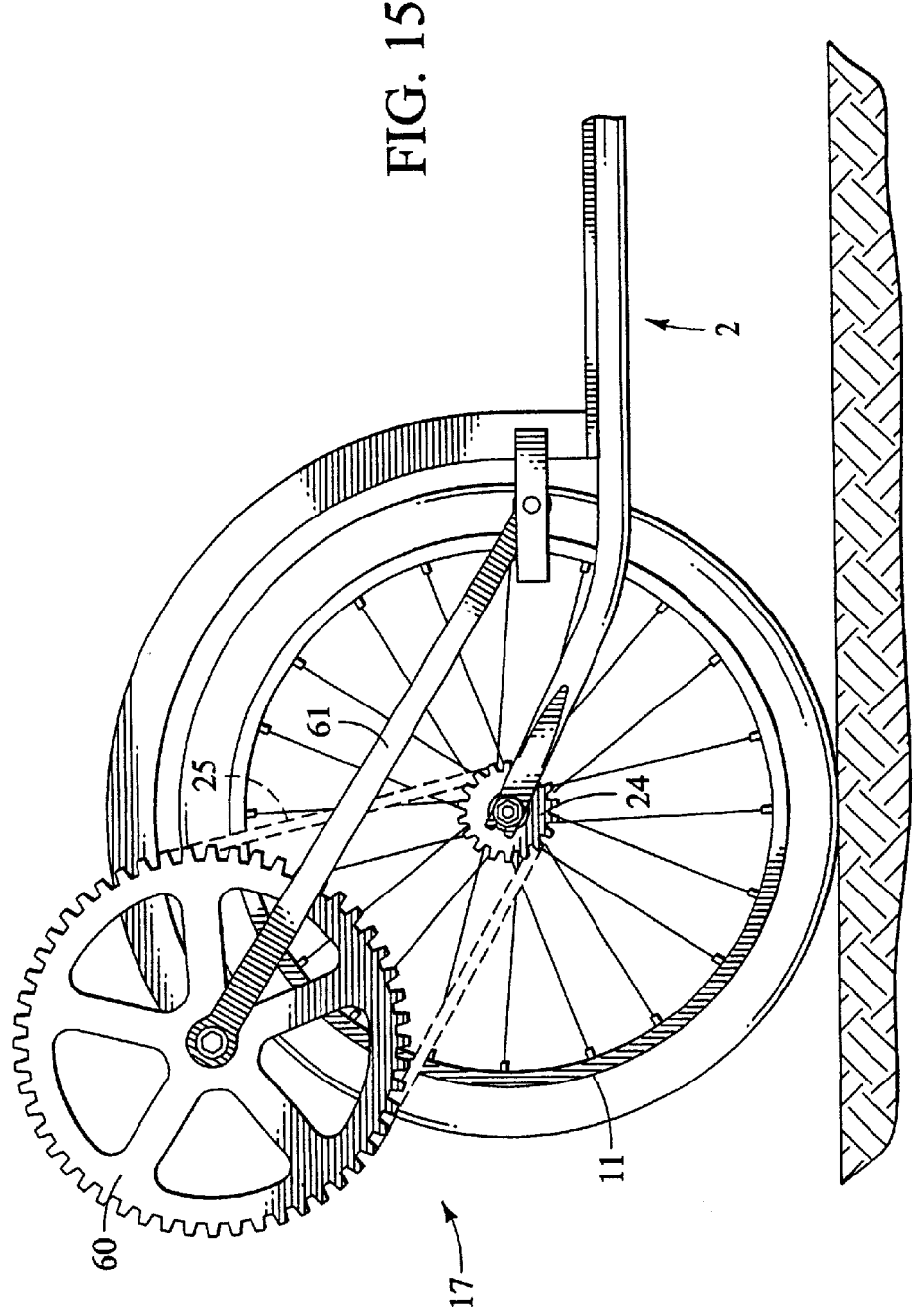
FIG. 15 is an enlarged left side view of the invention with a portion of the vehicle cut away, depicting the drive mechanism in a second position, according to the embodiment of FIG. 14.

The embodiment of the present invention as shown in FIGS. 14 and 15 includes a drive mechanism 17 modified to include a large sprocket 60 and pedal lever 61. The large sprocket 60 drives a small sprocket 24 and the rear wheel 11 via a chain 25. The large sprocket 60 has a larger diameter than the large sprocket 58, shown in FIGS. 12 and 13, and is positioned on the frame 2 rearwardly of the vertical centerline of the small sprocket 24 (i.e., rearwardly of the position of the large sprocket 58 of the embodiment shown in FIGS. 12 and 13). This embodiment also includes a pedal lever 61 that is longer than the pedal lever 59 of the embodiment shown in FIGS. 12 and 13. The size and position of the large sprocket 60 is possible due to the additional leverage from the longer pedal lever 61 of this embodiment.

Figure 16:
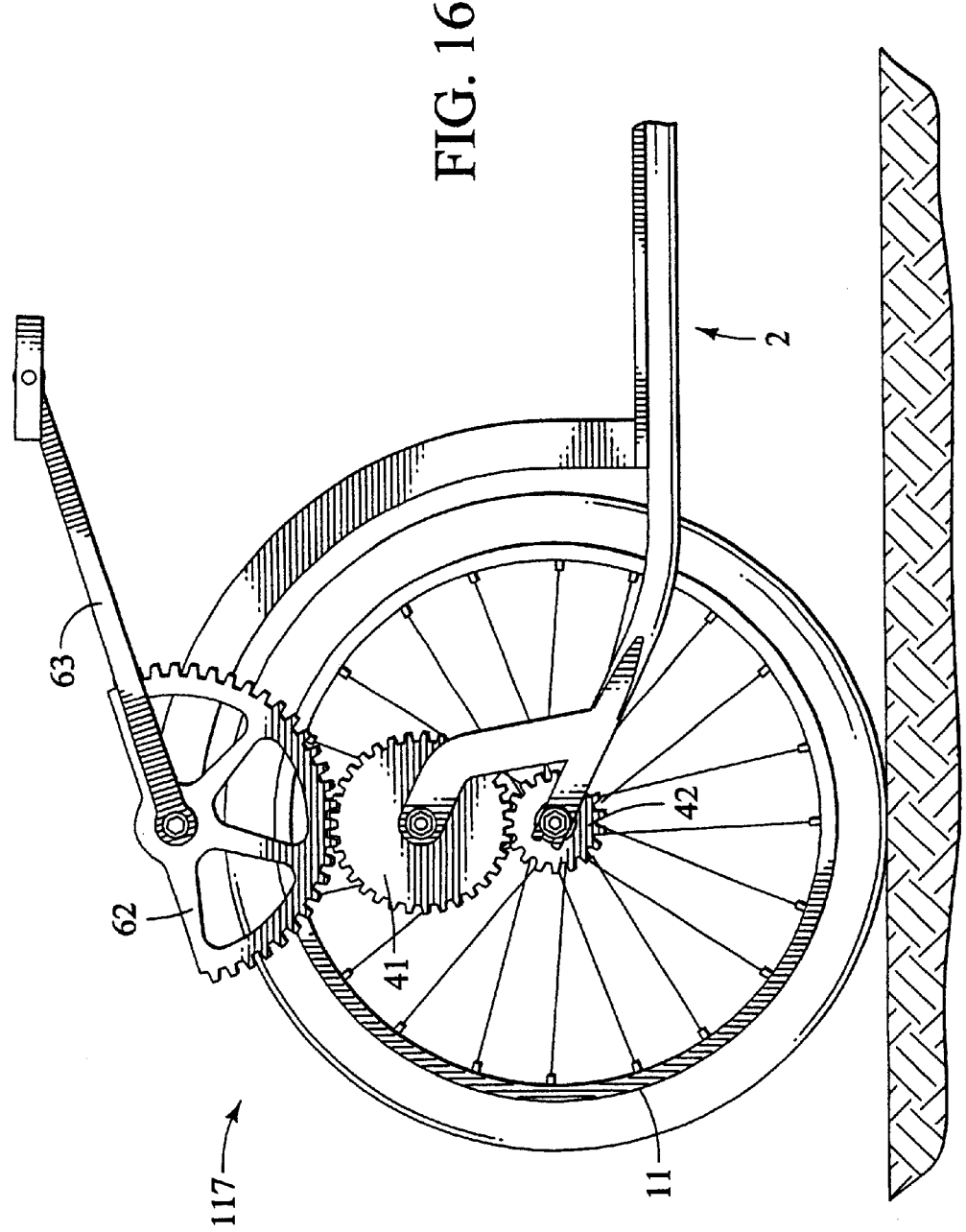
FIG. 16 is an enlarged left side view of the invention with a portion of the vehicle cut away, depicting a drive mechanism in a first position, according to a seventh embodiment of the present invention.

In a further embodiment of the present invention, shown in FIG. 16, the drive mechanism 117 of the second embodiment (shown in FIGS. 8 and 9) may be modified to include an arcuate toothed drive gear 62. The arcuate toothed drive gear 62 drives a driven ratcheting gear 42 and the rear wheel 11 via an idler or intermediate gear 41. The arcuate toothed drive gear 62 has a greater radius than the arcuate toothed drive gear 40 of the second embodiment of FIGS. 8 and 9 and is positioned on the frame 2 rearwardly of the position of the arcuate toothed drive gear 40 of the second embodiment. This embodiment also includes a longer pedal lever 63 than the pedal lever 20 of the second embodiment. The size and position of the arcuate toothed drive gear 62 is possible due to the longer pedal lever 63 of this embodiment.

Figure 17:
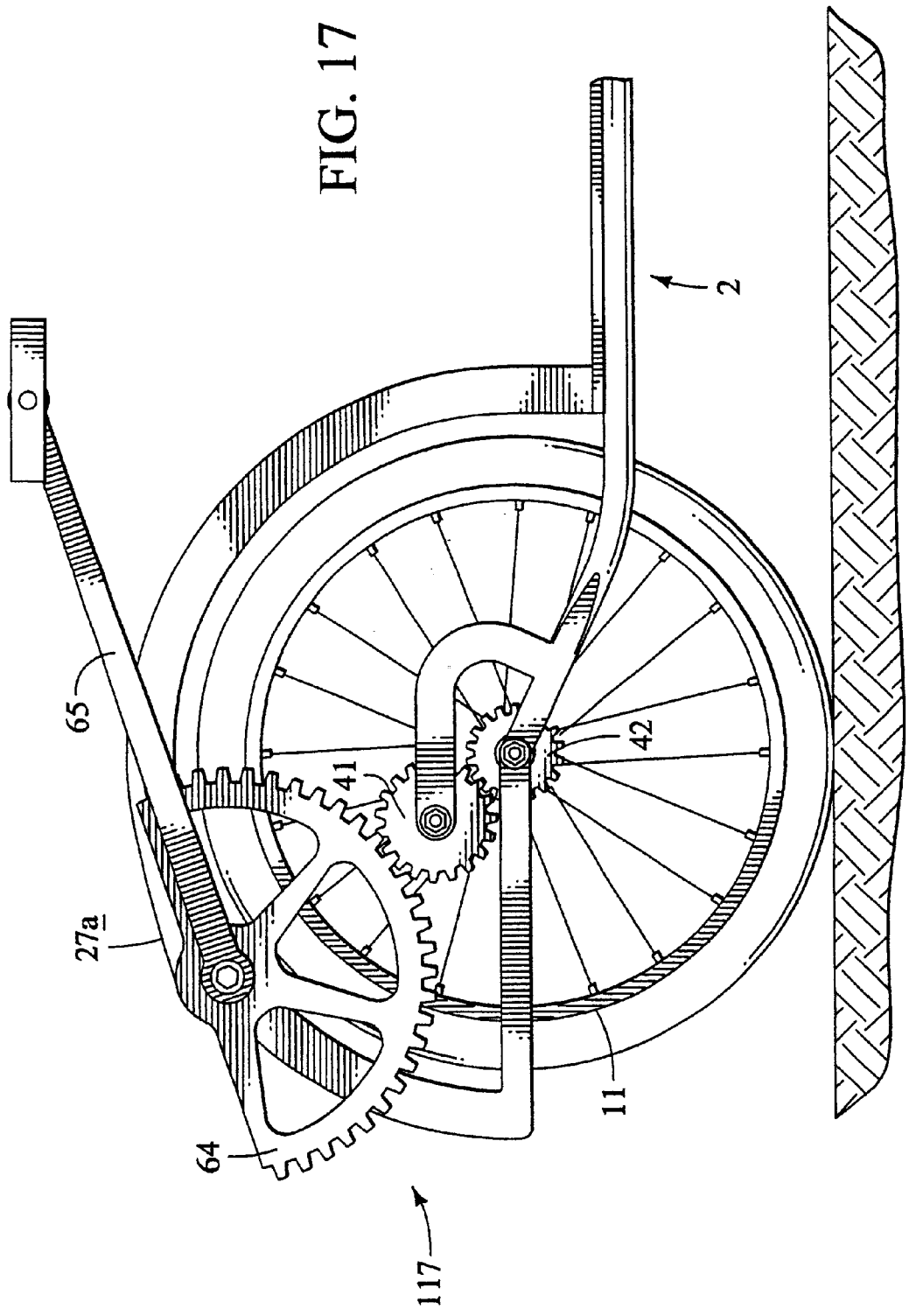
FIG. 17 is an enlarged left side view of the invention with a portion of the vehicle cut away, depicting a drive mechanism in a first position, according to an eighth embodiment of the present invention.

The embodiment of the present invention as shown in FIG. 17 includes a drive mechanism 117 modified to include an arcuate toothed drive gear 64 and a pedal lever 65. The arcuate toothed drive gear 64 drives a ratcheting sprocket 42 and the rear wheel 11 via an idler or intermediate gear 41. The arcuate toothed drive gear 64 has a larger diameter than the arcuate toothed drive gear 62, shown in FIG. 16, and is positioned on the frame 2 rearwardly of the position of the arcuate toothed drive gear 62. This embodiment also includes a pedal lever 65 that is longer than the pedal lever 63 of the embodiment shown in FIG. 16. The size and position of the arcuate toothed drive gear 64 is possible due to the longer pedal lever 65 of this embodiment.

Figure 18:
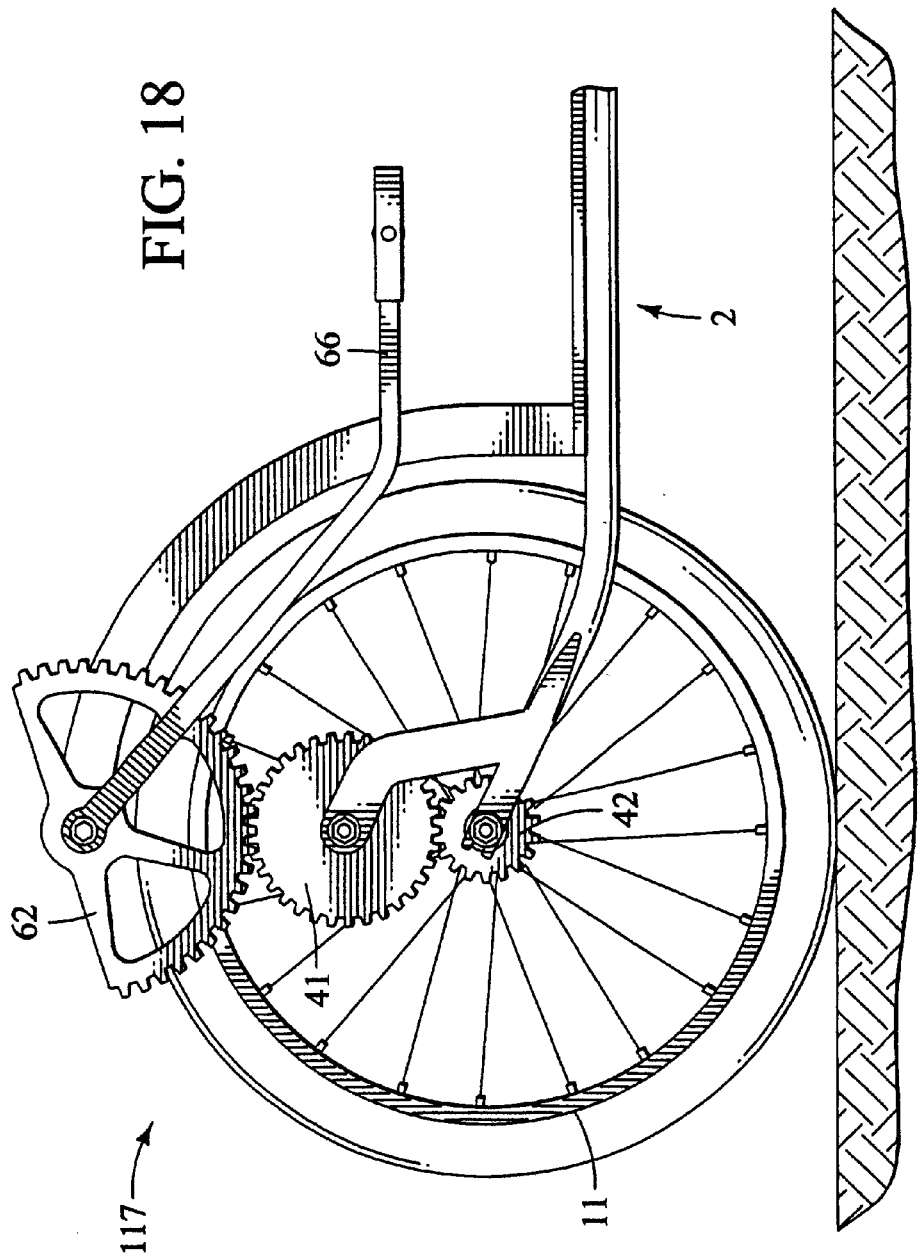
FIG. 18 is a left side view of a vehicle, depicting a drive mechanism in a first position, according to a ninth embodiment of the present invention.
Figure 19:
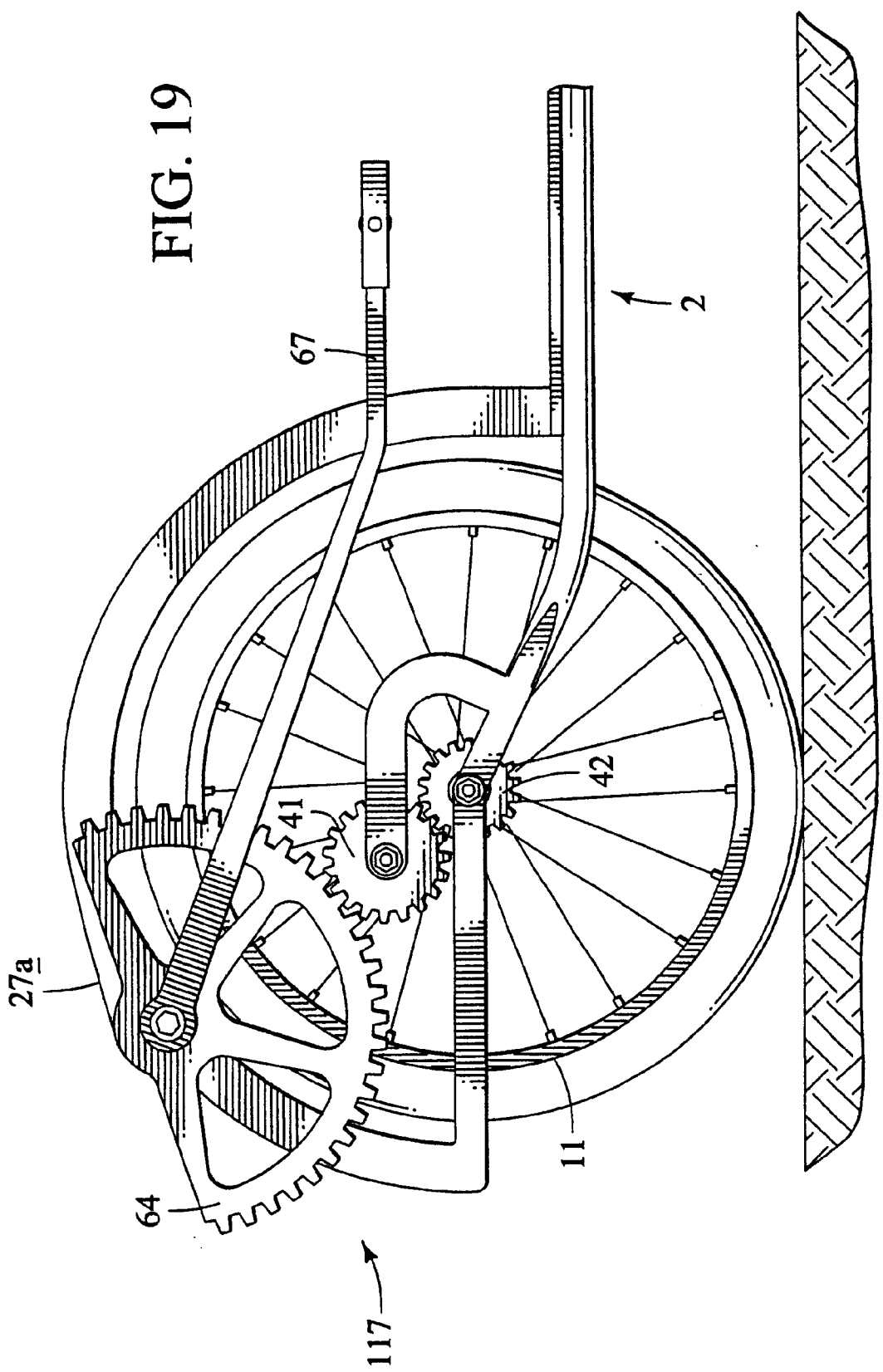
FIG. 19 is a left side view of a vehicle, depicting a drive mechanism in a first position, according to a tenth embodiment of the present invention.
Figure 20:
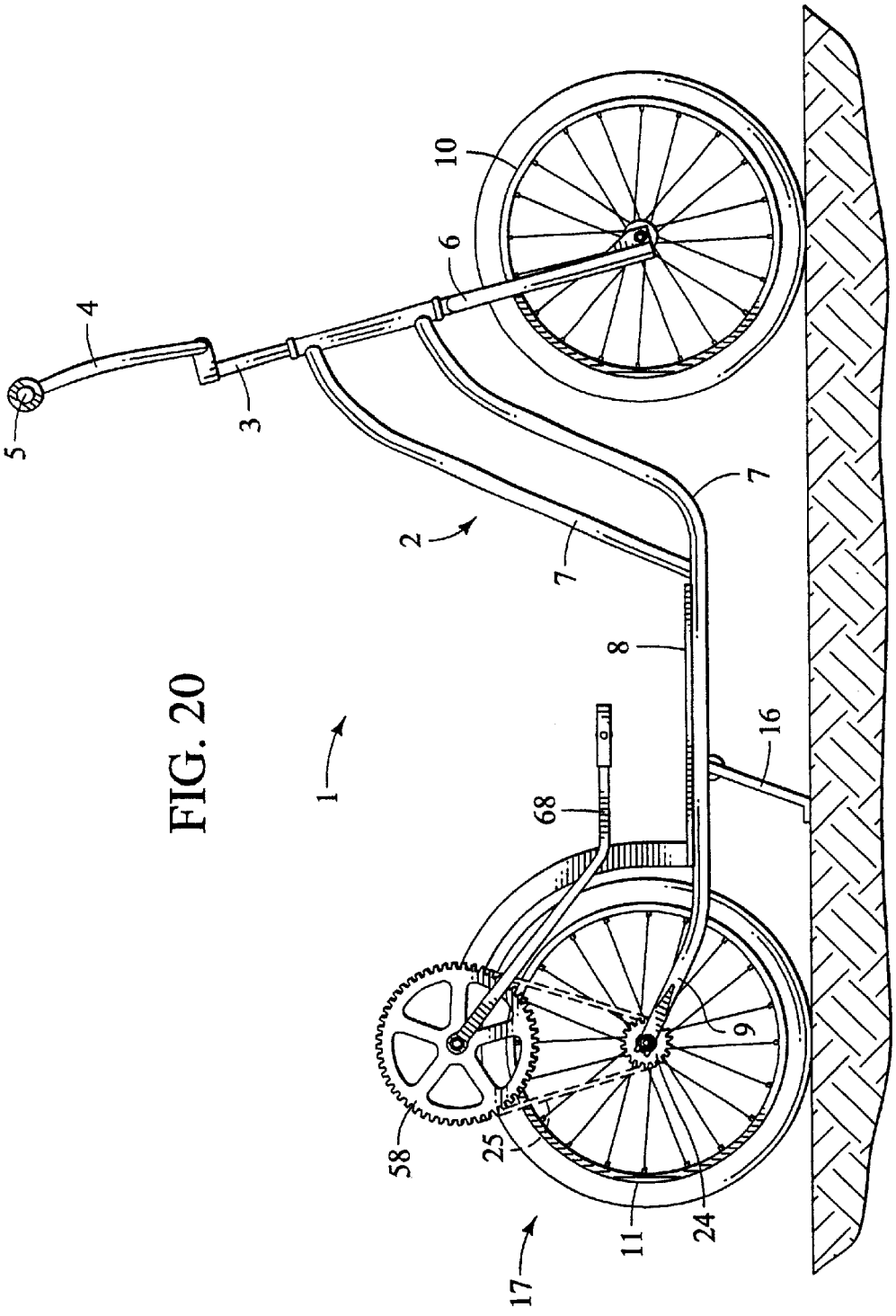
FIG. 20 is an enlarged left side view of the invention with a portion of the vehicle cut away, depicting a drive mechanism in a first position, according to an eleventh embodiment of the present invention.
Figure 21:
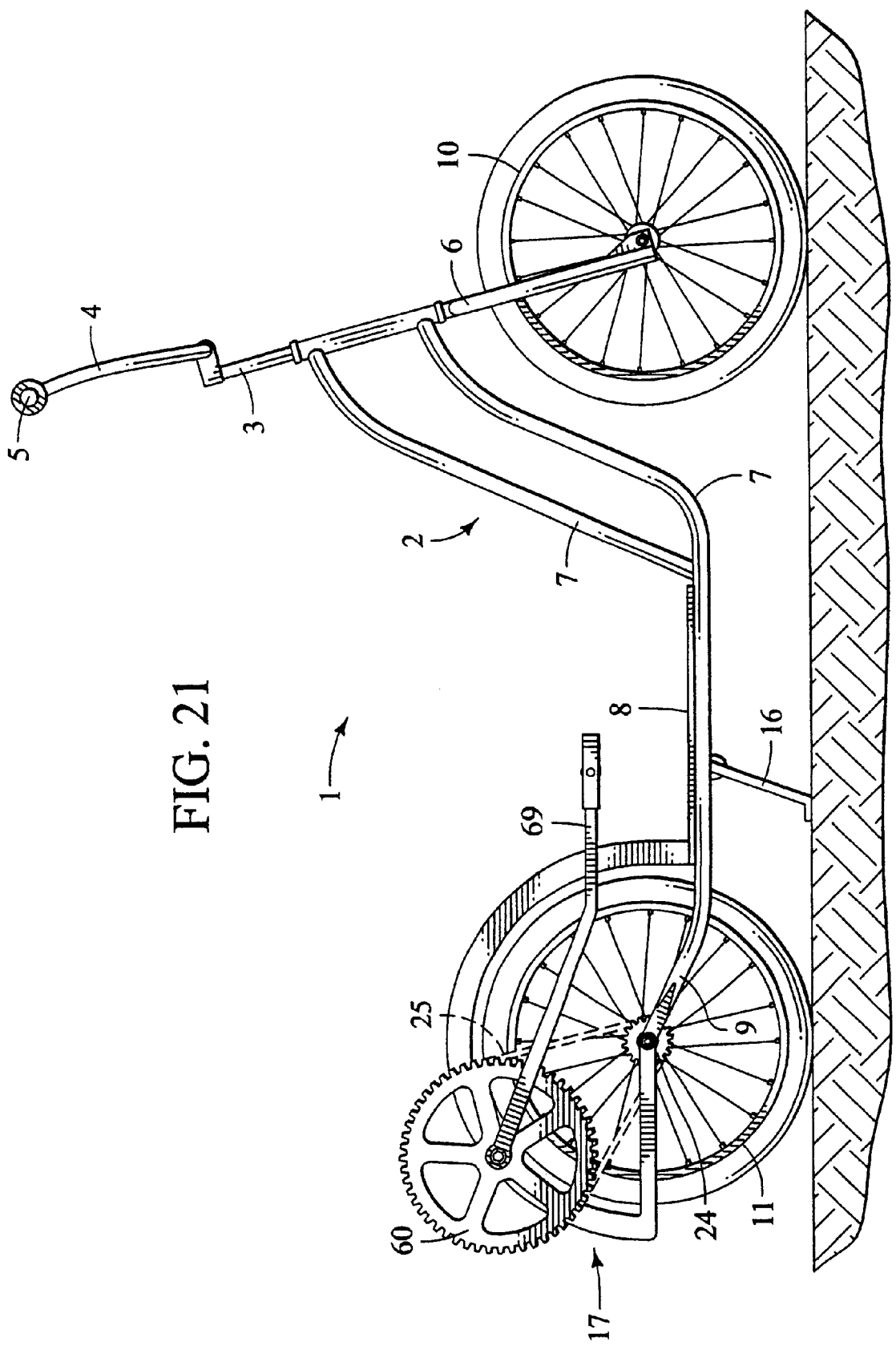
FIG. 21 is an enlarged left side view of the invention with a portion of the vehicle cut away, depicting a drive mechanism in a first position, according to a twelfth embodiment of the present invention.

The embodiment of the present invention shown in FIG. 18 includes a modification of the embodiment shown in FIG. 16 and includes an arcuate toothed drive gear 62 and a pedal lever 66 with an angled portion. The angled portion of the pedal lever 66 provides a more comfortable pedal position for the operator, and allows a full range of motion while preventing the pedal from contacting the road surface. The embodiment of the present invention shown in FIG. 19 includes a modification of the embodiment shown in FIG. 17 and includes an arcuate toothed drive gear 64 and a pedal lever 67 with an angled portion. FIG. 20 shows a modification of the embodiment of FIGS. 12 and 13 including a pedal lever 68 having an angled portion. FIG. 21 shows a modification of the embodiment of FIGS. 14 and 15 including a pedal lever 69 having an angled portion.

The drive system of the present invention has a unique way of capturing and transferring energy for the purpose of moving a wheeled vehicle and is especially efficient when adapted to a stand-on rolling platform, such as a scooter. This drive system also provides a high degree of comfort to the operator.

The following occurs during the power (downward) cycle of the stroke. On start up, the power is applied over the longest range of the stroke. As the vehicle gains speed, the range of available power gains of the stroke decreases proportionally. The top of the power stroke is used as an area of acceleration until it catches the power gain portion of the stroke. Eventually a point is reached whereby only a change in gear ratio can increase the potential for more power and speed.

There are several alternative configurations that can be applied to this drive system that allow it to become a multi-speed drive system, such as a system that relies on a simple leverage adjustment (not shown in the drawings) which can be accomplished easily during operation. This system only requires one gear ratio yet it performs as a multi gear ratio system, and may be applied in the chain and sprocket embodiments or the sector gear embodiments. As an example of such a system, a relatively high gear ratio is used, such as a 5:1 gear ratio. On start up, the drive gear and idler assembly is shifted to a point farthest from the operator, at the rearmost point of the system. The driven gear remains in one position relative to all other parts; and the drive gear and idler assembly may be shifted on a radius that follows the center of the driven gear. At the rearmost position, the increased leverage of the extended pedal crank compensates for the high gear ratio on startup. After startup and during operation, the drive gear and idler assembly are moved closer to the operator. As the distance from the center of the drive gear (which is the pivot point) to the pedal gets shorter, the distance the drive gear travels increases, taking advantage of the higher gear ratio to increase speed. The portion of the pedal crank arm between the drive sprocket and the pedal is telescopic to allow for the leverage adjustment while maintaining the same location of the pedal relative to the operator and platform section of the vehicle. The drive system of this embodiment provides a substantial increase in power and speed over the sprocket and chain system. The vehicle may be made in several sizes, including a faster version for teens and adults that is larger overall than a children's version. This shifting of the leverage point has the effect of increasing the length of stroke while the actual leverage factor is decreasing. The momentum of the vehicle as velocity increases allows the leverage factor to be decreased, causing the drive gear and driven gear to travel a farther rotary distance per stroke. As an example, a 6:1 gear ratio may be provided with the following components:

Drive gear: 9" radius gear, or 18" diameter spur gear segment, 220° stroke arc;

Idler gear: 3" diameter; and

Driven gear: 3" diameter.

The drive gear and idler gear may be affixed to a mounting plate which has its own pivot point. This assembly is free to be moved or shifted around the radius of the driven gear, maintaining a parallel relationship to the driven gear radius in all positions. On start up, the assembly consisting of the drive gear, idler gear, and mounting plate is in the rearmost position. In this example, there is 24" from the pedal crank pivot point (the center of the drive gear) to the centerline of the pedal, located at the opposite end of the pedal crank arm. Due to the distance from the pedal to the pivot point of the drive gear, there is a large amount of leverage, which allows the operator to accelerate the vehicle despite the high gear ratio. The pedal travel relative to the rotary distance being traveled per stroke of the drive gear is low. Once velocity has increased to a point where the effective power gain per stroke has diminished significantly, it is time to shift. Instead of shifting gears, the leverage factor is shifted. This shifting can be accomplished by means of one or more levers, one or more cables, or a combination of the two. By shifting it is meant that the pivot point of the drive gear is moved closer to the pedal where input power is being transmitted to the system. The center of the drive gear will travel upwardly as it is moved forwardly, cresting at the half way point between maximum forward and maximum rearward positions since the drive gear follows the radius of the driven gear as it is moved about the drive assembly pivot point of the mounting plate. Once the drive gear passes the half way point it descends vertically until it reaches the forward most position. With the pivot point of the drive gear at the forward most position, with a theoretical overall leverage factor 10" (the distance between the centerline of the pedal and the drive gear pivot point or center) leverage is decreased and rotary distance traveled by the drive gear (per stroke) has increased, effectively providing a means to increase the velocity of the vehicle.

Another multi-speed version (not shown in the drawings) may include a small gearbox and a final drive system of sprockets and a chain or belt. The gearbox may have gear ratio settings of 1:1 or 3:1. A sprocket attached to the output shaft of the gearbox and a one-way or ratcheting driven sprocket attached to the rear wheel hub have a 3:1 gear ratio. This provides a final gear ratio of 3:1 when the gearbox is in the 1:1 gear ratio setting and a final gear ratio of 6:1 when the gearbox is in the 3:1 gear ratio setting. The gear ratio of the final drive portion of this type of system is the lowest gear ratio that can be achieved. Any higher gear ratio that is desired may easily be achieved within the gearbox mechanism, in any combination of incremental increases. The gearboxes that can be utilized to provide multi-speed capability can be relatively small and lightweight given the fact that the components will be subjected to relatively low maximum forces. Additionally, a gearbox or gearboxes (one on each side of the vehicle) may be located anywhere on the rear of the vehicle, including at the rearmost portion of the vehicle, preventing interference with operator comfort or safety by presenting clearance or space problems. Further, positioning the gearbox rearwardly provides a pedal crank lever leverage increase. A gearbox embodiment may also be used with a quick change pedal system or a two pedal system, as described above; (i.e., input power can be transmitted from either side using the quick change pedal or two pedal system). A gearbox may also be used for supporting a drink cooler, a basket, or custom racks, such as, for example, for a fishing pole or a surfboard. Such items may be secured to the top or sides of the gearbox.

A planetary style multi-speed gearbox may easily be adapted to a final drive of a sprocket and chain system as well. An all gear drive system may be configured in a long thin space that would hug the side of the rear tire on one or both sides, keeping the overall vehicle width to a minimum. A dual gearbox embodiment would take on the appearance or shape much like that of two thin side saddlebags next to the rear tire. The multi speed system of the vehicle of the present invention may include any number of speeds, such as a fifteen speed embodiment for racing.

Figure 22:
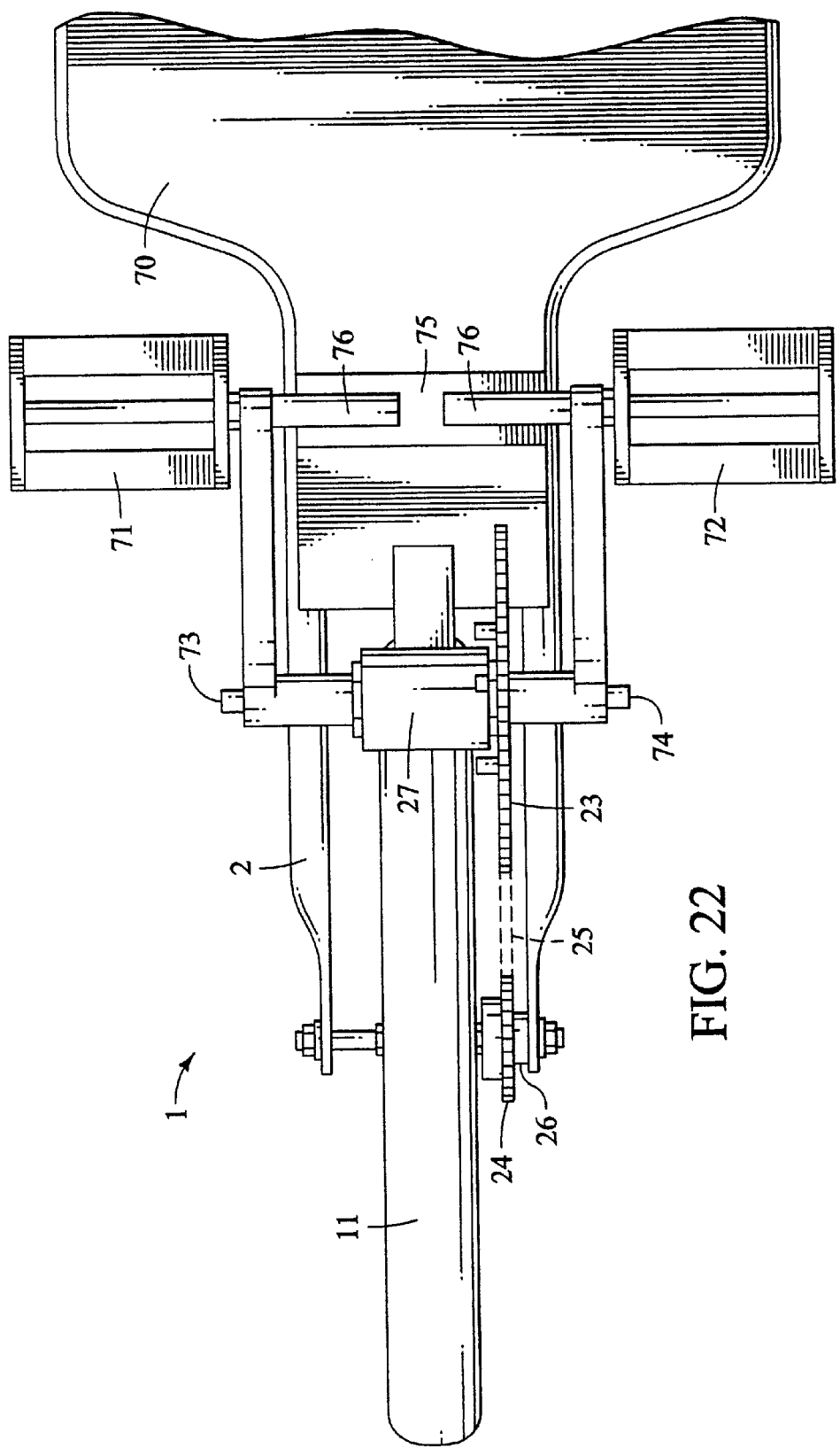
FIG. 22 is an enlarged top view of the invention with a portion of the vehicle cut away, depicting a double pedal mechanism, according to a thirteenth embodiment of the present invention.

In a further embodiment of the present invention, shown in FIG. 22, the vehicle may include two pedals, to allow operation by either the left or right foot. The vehicle 1 of this embodiment includes a modified platform 70, a left pedal 71, and a right pedal 72. The modified platform 70 has a T shape to allow passage of the pedals beyond the plane of the modified platform 70, and to allow for safe and comfortable pedaling during operation. Such passage of the pedals beyond the modified platform 70 maximizes the power available, and makes up for some power that may be lost at the top or beginning of the power stroke. The vehicle 1 includes drive mechanisms (17 or 117 as described above) that are mirror images of each other; and the pedal lever length is dependent upon the location of the arcuate toothed drive gear or large sprocket (i.e., in the several embodiments as described above). The left side drive mechanism may be secured to the frame 2 with a left hand thread cap screw 73 and the right side drive mechanism may be secured to the frame 2 with a right hand thread cap screw 74. The modified platform 70 further includes a pad 75 constructed of, for example, rubber. This embodiment may further include extensions 76 from the pedal levers. At the bottom of the down, or power, stroke of the pedal lever, the extension 76 strikes the pad 75, which acts as a stop for the pedal lever 21 to define the bottom of the stroke. The extension may be any of several shapes which define the bottom of the power stroke above, at, or below the plane of the platform 70.

Figure 23:
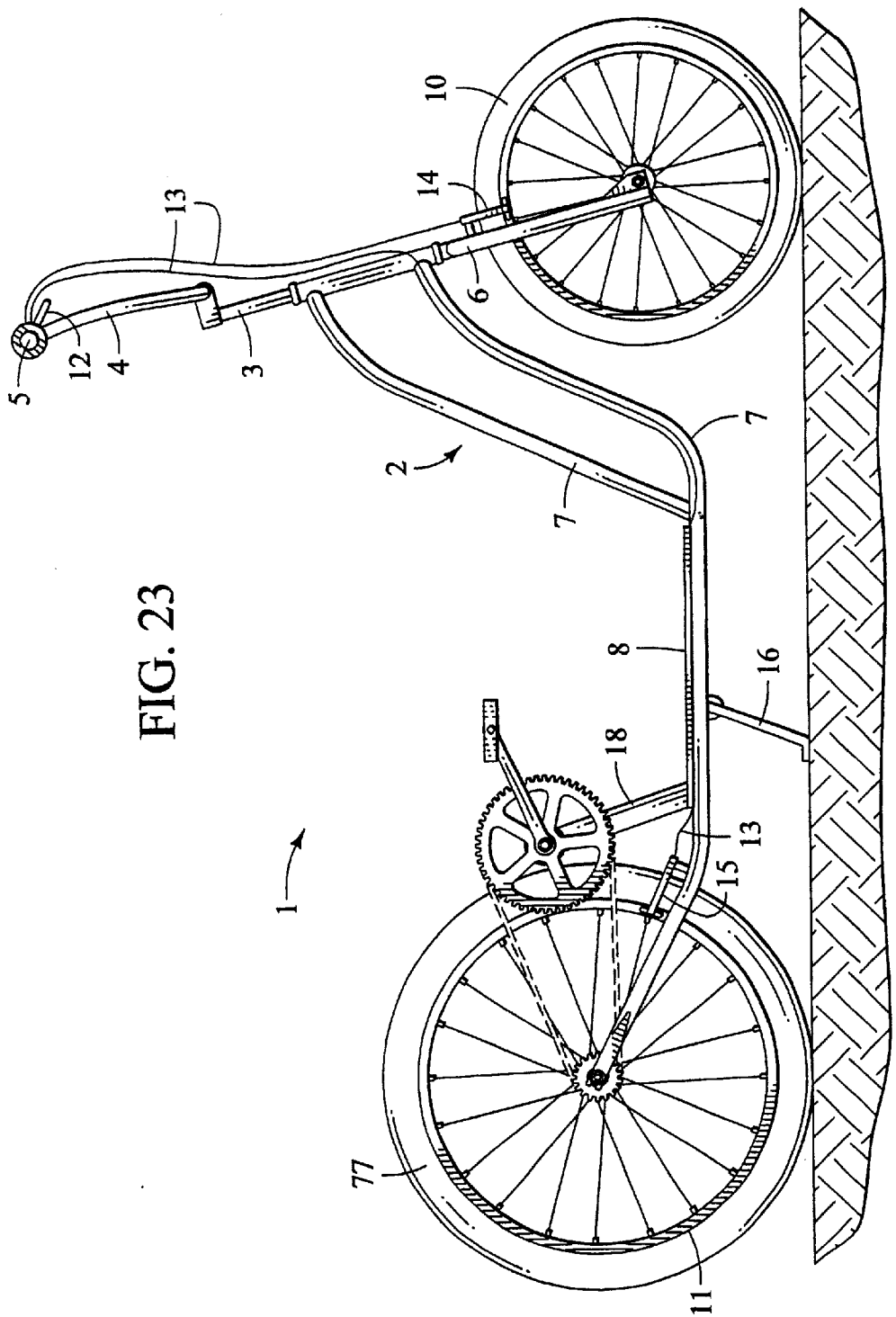
FIG. 23 is an enlarged left side view of the invention with a portion of the vehicle cut away, depicting the double pedal mechanism, according to the embodiment of FIG. 22.

In the embodiment of the present invention shown in FIG. 23, the vehicle 1 includes a large rear tire or wheel 77 that is larger than the front wheel. The vehicle 1 of this embodiment with the large rear wheel 77 may be used for riding on rough terrain, such as grass, rocks, and weeds, and for going uphill. The large rear wheel 77 may include a knobby tire for increased traction, and may be, for example, 20 inches in diameter.

Figure 24:
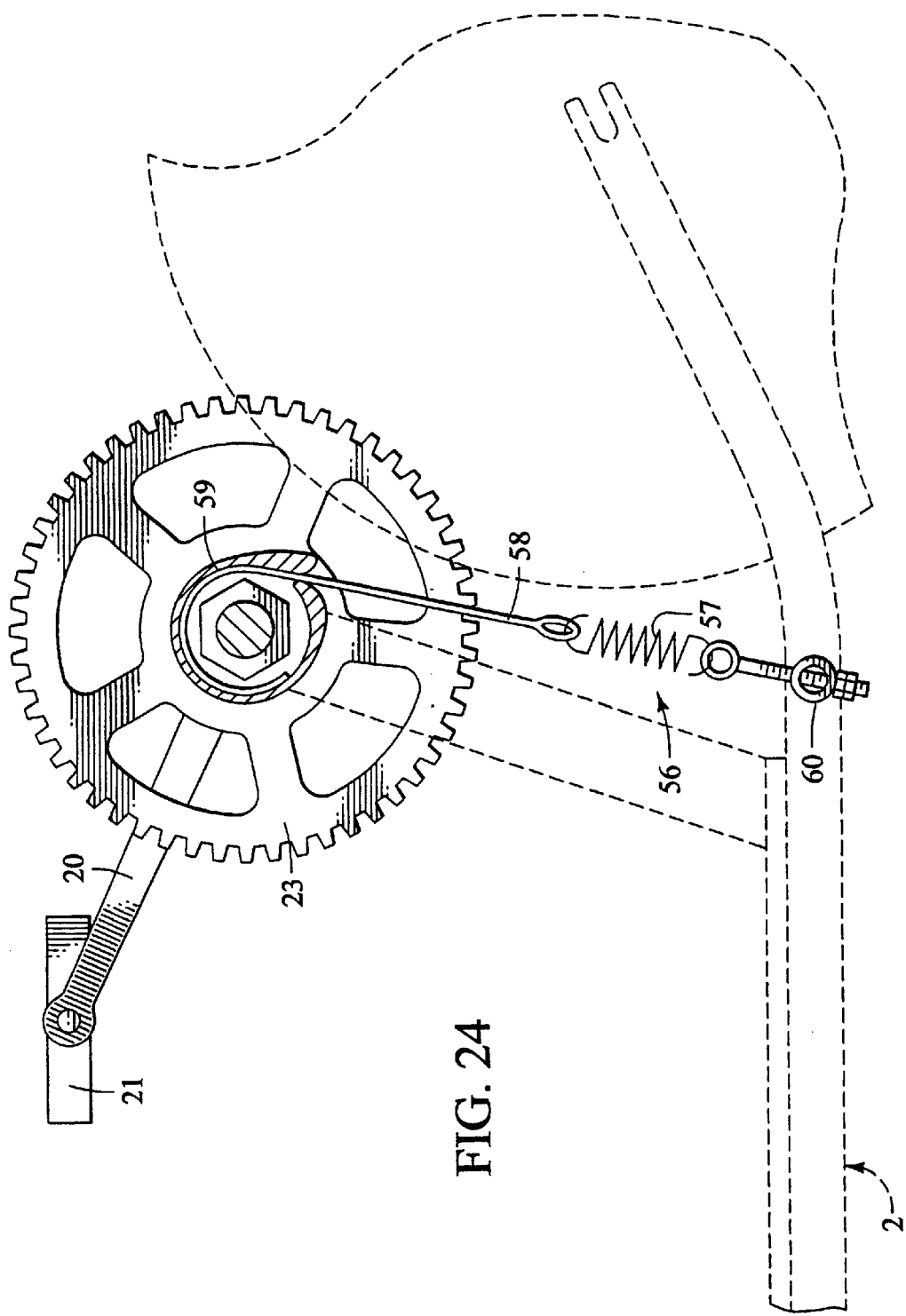
FIG. 24 is an enlarged right side view of the invention with a portion of the vehicle cut away, depicting an alternative pedal return spring mechanism, according to a fourteenth embodiment of the invention.
Figure 26:
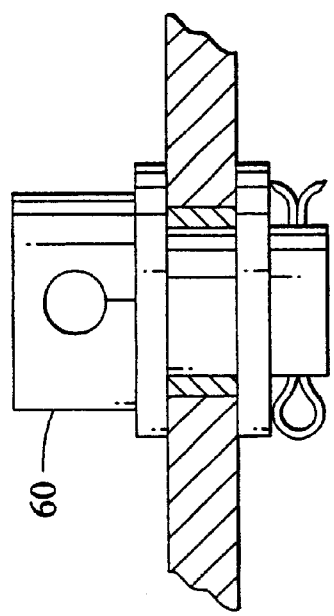
FIG. 26 is an enlarged top view of the invention with a portion of the vehicle cut away, depicting the spring pivot of the alternative pedal return spring mechanism, according to the fifteenth embodiment of the invention.
Figure 25:
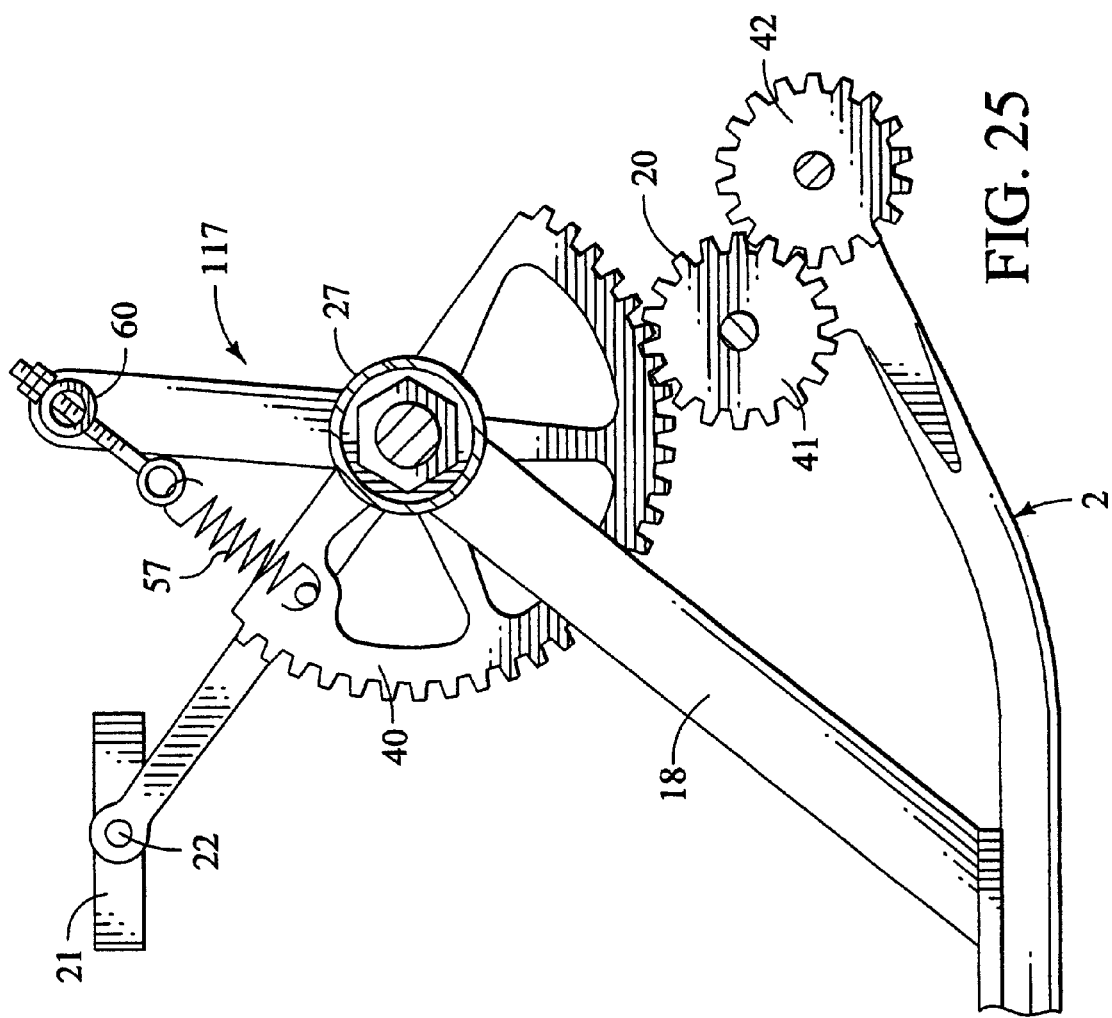
FIG. 25 is an enlarged right side view of the invention with a portion of the vehicle cut away, depicting an alternative pedal return spring mechanism, according to a fifteenth embodiment of the invention.

In a further embodiment of the present invention, shown in FIGS. 24–26, the torsion spring system for pedal return may be replaced by a coil spring system 56 for pedal return, mounted on the side of the sprockets or gears opposite to the pedal. In this embodiment, the extension spring stores the potential energy that returns the pedal to the top of the power stroke. The coil spring pedal return system 56 includes an extension spring 57, a tensioner provided at one end of the extension spring 57, and a mounting device 60 provided at the other end of the extension spring 57. The present invention may include any suitable type of tensioner, and in the present embodiment includes a wire rope 58. The tensioner may also be of other types known in the art, such as "Bungee" cord type tensioner. The wire rope 58 is received in a wire rope channel 59 having a belled entrance, and the wire rope channel 59 is mounted on a peripheral area of the drive sprocket or drive sector gear of the above described embodiments. As shown in FIG. 24, the mounting device 60 includes an eyebolt provided at an end of the extension spring 57, a pivot and pivot housing, a spring tension adjustment nut, and a jam lock nut, all mounted on the frame 2. As shown more particularly in FIG. 26, the pivot and pivot housing may be mounted on the frame 2 through a hole in the frame 2 with flat washers, a frame bushing, and a cotter key or hairpin clip. As shown in FIG. 25, the coil spring pedal return system 56 is mounted on the drive gear or drive sprocket and the frame 2 to return the pedal 21 to the up position. The tension in the extension spring 57 may be adjusted by the spring tension adjustment nut. The tension adjustment nut allows for tension adjustment throughout the life of the spring to compensate for spring weakening or friction changes that may occur between drive system components over time. Further, the coil spring pedal return system 56 is easy to replace and service, and the coil spring pedal return system 56 may be mounted on any of the three gears in the sector gear system (i.e., the coil spring need not be mounted on the drive gear), or to more than one of the gears or sprockets. This provides for a multitude of options available pertaining to the location of the pedal return system components. In the sector gear embodiments, the wire rope component of the system may be attached to the hub portion of the gear. This hub portion should be relatively small in diameter to allow for as short a maximum spring deflection as is reasonably achievable. A pivoting component through which the spring tensioning eyebolt passes is advantageous in an embodiment including a segment gear in the high ratio/high leverage configuration comprises the drive system as shown in FIGS. 25 and 26. The wire rope component need not include a pivoting member, but may simply be securely fastened to a stationary frame member since the point at which the wire rope contacts the hub remains substantially constant (due to the short radius from the center of the gear to the wire rope fixing location) relative to the point where the other end of the spring is affixed to the stationary member. Further, a similar system, using a compression spring, may be utilized.

Figure 27:
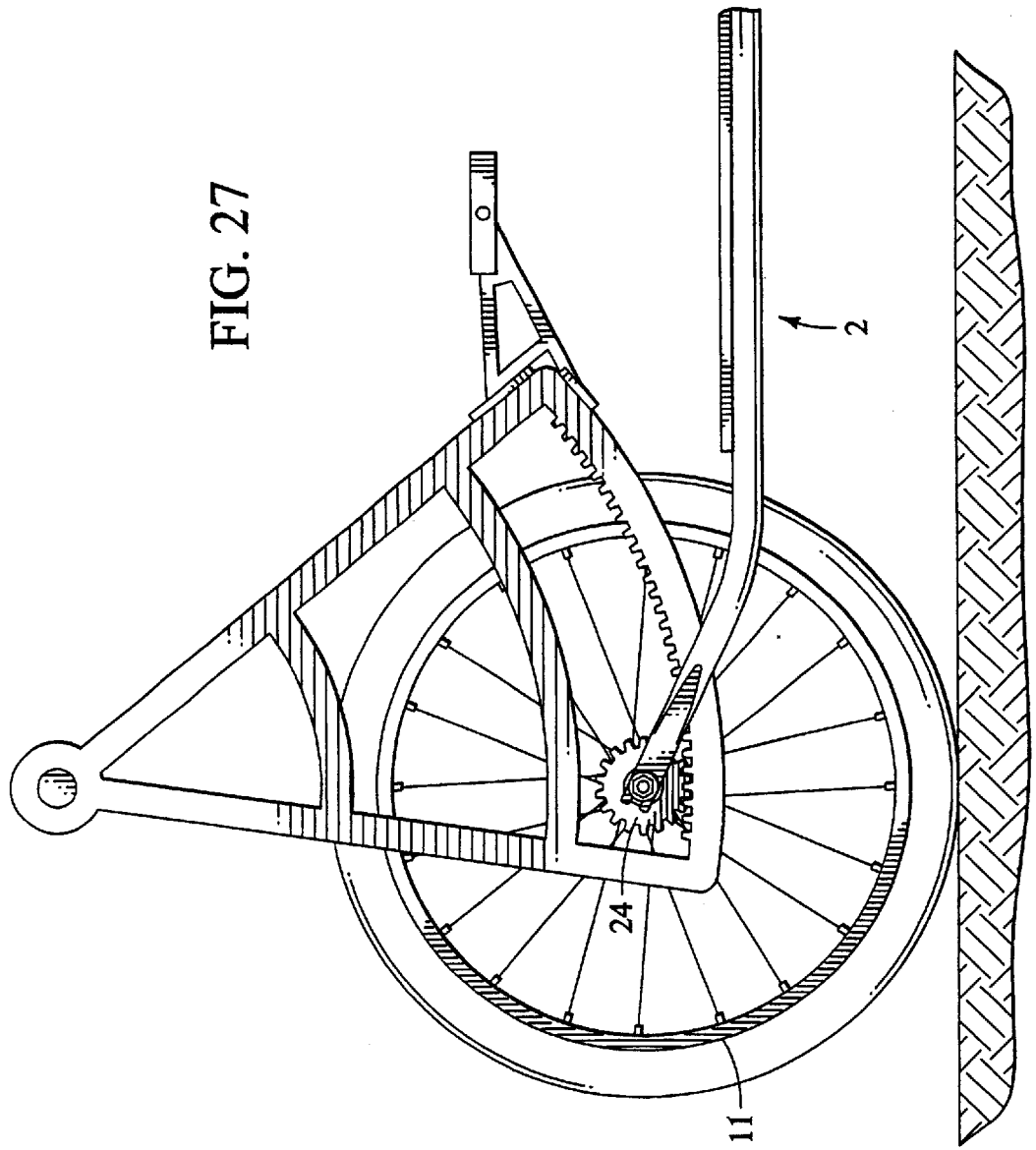
FIG. 27 is an enlarged left side view of the invention with a portion of the vehicle cut away, depicting a drive mechanism, according to a sixteenth embodiment of the present invention.

As shown in FIG. 27, a farther embodiment of the present invention includes an alternative drive gear segment configuration. The drive system of this embodiment provides a vehicle weight reduction as well as lower component quantity requirements, and resulting lower production costs. In this embodiment, the idler gear and related components are eliminated. This drive system of this embodiment includes an internal tooth gear segment rather than an external tooth gear segment, shown in the prior embodiments. In this embodiment, the pedal crank arm telescopes to maintain a very slight arc of the stroke. A simple linkage consisting of one rod and two tie rod ends attached to the pedal crank arm and a rigid frame member may be provided.

The vehicle 1 of the present invention may include plastic or fiber gears, tubular or lightweight frame members and low-friction bearings; and some or all of the components may be formed of any suitable synthetic or natural plastic.

The vehicle 1 of the present invention may farther include more than two wheels. The vehicle may include three wheels, with, for example, two wheels in the rear and one wheel in the front. Alternatively, the vehicle may include four wheels, with two wheels in the rear and two wheels in the front.

The vehicle 1 of the present invention may further include additional components, which may be added or removed as desired by the operator to provide more features and amenities. For example, the vehicle 1 of the present invention may include a seat or saddle for the operator, to rest after pedaling and coast, or to sit on while pedaling. Alternatively, a seat or saddle may be used by a passenger, while the operator is supported by the platform. The vehicle 1 of the present invention may include a child's safety seat, or a basket in the front or in the rear of the vehicle, to carry articles, such as, for example, purchases. The vehicle 1 of the present invention may further include components that make the vehicle 1 more visible during the day and night, and safety features, such as lights. The vehicle may further include a custom locking system, to lock the vehicle at school, work, or a shopping center. The vehicle 1 of the present invention may further include a storage area, or an insulated cooler, such as, for example, of the soft or hard type that holds one or more drinks.

The vehicle 1 of the present invention may further include a speedometer, such as, for example, a wind gauge speedometer. A speedometer would be simple in construction, low cost, and would not compromise the safety of the operator.

The vehicle 1 of the present invention has many uses and may be configured in many styles. For example, the vehicle 1 may be used as a recreational vehicle, or a serious transportation vehicle. The vehicle 1 of the present invention may be configured as an all terrain vehicle, with larger wheels and lower gear ratios to allow for off road traveling and hill climbing, such as for cross country skiing in the summer, and to be able to climb steep grades. The vehicle may be configured for use on the beach or in the desert, with tires designed for that purpose. The vehicle 1 of the present invention may include variable combinations of wheel size, gear ratio, and leverage (of the pedal arm) to provide a variety of performance options; and may include multiple gears. The vehicle 1 of the present invention may be provided in a multiple passenger model; and may include a hand pump to operate the gear and sprocket or sector gear drive system. Additionally, belts and pulleys utilized as drive train components are a possibility.

The vehicle of the present invention will be useful in traffic on busy streets during rush hour, and is more pedestrian-friendly than a bicycle.

The vehicle 1 of the present invention includes many advantages, including exposing the operator to less risk of injury than the push type scooters, and is more comfortable, especially during continuous riding over distances, than the push type scooters. The vehicle 1 is quieter, less expensive and less dangerous than a gas or electric model. Further, some localities have prohibited the use of gas or electric powered scooters in certain areas.

The frame 2 of the vehicle 1 of the present invention may be configured of a suitable tubular material, such as, for example, metal. Further, components, such as a protective fender, protective side cover and the pedal return system may be mounted on the frame 2.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

What is claimed is:

1. An occupant propelled vehicle comprising:
   a frame, said frame including a front portion and a rear portion;
   a front wheel provided on said front portion of said frame;
   a rear wheel provided on said rear portion of said frame;
   a platform for supporting an occupant, said platform provided between said front and rear portions on said frame;
   a steering mechanism provided on said frame; and
   an oscillating drive mechanism comprising:
      a drive sprocket mounted on said frame so that said drive sprocket is positioned entirely above said platform, said drive sprocket having a central axis and an axle therethrough, said drive sprocket being rotatable with said axle;
      a driven sprocket rotatable with said rear wheel;
      a pedal crank arm, said pedal crank arm having a first end provided on said drive sprocket axle, and a second end having a pedal attached thereto; and
      an endless chain drivingly provided around said drive sprocket and said driven sprocket, wherein oscillation of said pedal and said crank arm rotates said drive sprocket and said rear wheel therewith and propels said occupant propelled vehicle in a forward direction;
   wherein said drive sprocket oscillates through an arc up to 220°.

2. An occupant propelled vehicle comprising:
   a frame, said frame including a front portion and a rear portion;
   a front wheel provided on said front portion of said frame;
   a rear wheel provided on said rear portion of said frame;
   a platform for supporting an occupant, said platform provided between said front and rear portions on said frame;
   a steering mechanism provided on said frame; and
   a drive mechanism comprising:
      a drive sprocket mounted on said rear portion of said frame so that said drive sprocket is positioned entirely above said platform, said drive sprocket having a central axis and an axle therethrough, said drive sprocket being rotatable with said axle;
      a driven sprocket provided coaxially with said rear wheel and rotatable therewith;
      a pedal crank arm, said pedal crank arm having a first end provided on said drive sprocket axle, and a second end having a pedal attached thereto; and
      an endless chain drivingly provided around said drive sprocket and said driven sprocket, wherein downward force on said pedal and said crank arm rotates said drive sprocket, which drives said driven sprocket and said rear wheel therewith and propels said occupant propelled vehicle in a forward direction;
   wherein said drive sprocket oscillates through an arc up to 220°.

3. The occupant propelled vehicle according to claim 2, said occupant propelled vehicle further comprising:

a stationary stop provided on said rear portion of said frame, adjacent said drive sprocket;

a front stop provided on said drive sprocket; and a rear stop provided on said drive sprocket, wherein said stationary, front and rear stops interact and prevent fall rotation of said drive sprocket so that said occupant propelled vehicle is propelled in a forward direction by oscillation of said drive sprocket between positions of said front and rear stops.

4. The occupant propelled vehicle according to claim 3, wherein said pedal is provided on a first side of said drive sprocket, said front stop is provided in a first position on a second side of said drive sprocket, and said rear stop is provided in a second position on said second side of said drive sprocket, so that said drive sprocket oscillates between a first position in which said rear stop engages said stationary stop and a second position in which said front stop engages said stationary stop.

5. The occupant propelled vehicle according to claim 3, wherein said front and rear stops are positioned on a side of said drive sprocket 220° apart.

6. The occupant propelled vehicle according to claim 3, said occupant propelled vehicle further comprising:

a crank housing provided on said frame;

a torsion spring provided in said crank housing, said torsion spring including a first end connected to said crank housing, and a second end connected to and movable with said drive sprocket axle, wherein said oscillation of said drive sprocket tightens and loosens said torsion spring so that downward force on said pedal by an occupant rotates said drive sprocket until said rear stop abuts said stationary stop, and the return force of said torsion spring rotates said drive sprocket in an opposite direction until said front stop abuts said stationary stop.

7. The occupant propelled vehicle according to claim 6, wherein said stationary stop is provided on an outer surface of said crank housing.

8. The occupant propelled vehicle according to claim 6, said occupant propelled vehicle further comprising:

a stirrup provided on said pedal.

9. The occupant propelled vehicle according to claim 3, said occupant propelled vehicle further comprising:

a stirrup provided on said pedal.

10. The occupant propelled vehicle according to claim 2, wherein said drive sprocket is mounted on said frame in a position forward of said driven sprocket.

11. The occupant propelled vehicle according to claim 2, wherein said drive sprocket is mounted on said frame in a position above said driven sprocket.

12. The occupant propelled vehicle according to claim 2, wherein said pedal crank arm includes a linear member.

13. The occupant propelled vehicle according to claim 2, said occupant propelled vehicle further comprising:

a stirrup provided on said pedal.

14. An occupant propelled vehicle comprising:

a frame, said frame including a front portion and a rear portion;

a front wheel provided on said front portion of said frame;

a rear wheel provided on said rear portion of said frame;

a platform for supporting an occupant, said platform provided between said front and rear portions on said frame;

a steering mechanism provided on said frame; and a drive mechanism comprising:

a drive gear mounted on said frame so that said drive gear is positioned entirely above said platform, said drive gear having a central axis and an axle therethrough, said drive gear being rotatable with said axle;

a driven gear mounted coaxially with said rear wheel and movable therewith, said driven gear drivingly connected to said drive gear; and a pedal crank arm, said pedal crank arm having a first end provided on said drive gear, and a second end having a pedal attached thereto, wherein downward force on said pedal and said crank arm rotate said drive gear, which drives said driven gear and said rear wheel therewith, and propels said occupant propelled vehicle in a forward direction;

wherein said drive gear oscillates through an arc up to 220°.

15. The occupant propelled vehicle according to claim 14, said occupant propelled vehicle farther comprising:

a stationary stop provided on said rear portion of said frame;

a front stop provided on said drive gear; and a rear stop provided on said drive gear, wherein said stationary, front and rear stops interact and prevent full rotation of said drive gear so that said occupant propelled vehicle is propelled in a forward direction by oscillation of said drive gear between positions of said front and rear stops.

16. The occupant propelled vehicle according to claim 15, wherein said front stop is provided in a first position on said drive gear, and said rear stop is provided in a second position on said drive gear, so that said drive gear oscillates between a first position in which said rear stop engages said stationary stop and a second position in which said front stop engages said stationary stop.

17. The occupant propelled vehicle according to claim 15, said occupant propelled vehicle further comprising:

a crank housing provided on said frame;

a torsion spring provided in said crank housing, said torsion spring including a first end connected to said crank housing, and a second end connected to and movable with said drive gear axle, wherein said oscillation of said drive gear tightens and loosens said torsion spring so that downward force on said pedal by an occupant rotates said drive gear until said rear stop abuts said stationary stop, and the return force of said torsion spring rotates said drive gear in an opposite direction until said front stop abuts said stationary stop.

18. The occupant propelled vehicle according to claim 17, wherein said stationary stop is provided on an outer surface of said crank housing.

19. The occupant propelled vehicle according to claim 17, said occupant propelled vehicle further comprising:

a stirrup provided on said pedal.

20. The occupant propelled vehicle according to claim 15, said occupant propelled vehicle farther comprising:

a stirrup provided on said pedal.

21. The occupant propelled vehicle according to claim 14, said occupant propelled vehicle further comprising:

a stirrup provided on said pedal.

* * * * *

UNITED STATES PATENT AND TRADEMARK OFFICE
CERTIFICATE OF CORRECTION

PATENT NO. : 6,619,682 B2
DATED : September 16, 2003
INVENTOR(S) : N. Carr et al.

It is certified that error appears in the above-identified patent and that said Letters Patent is hereby corrected as shown below:

Column 19,
Line 5, "fall" should be -- full --.

Column 20,
Lines 20 and 58, "farther" should be -- further --.

Signed and Sealed this

Twenty-first Day of June, 2005

JON W. DUDAS
*Director of the United States Patent and Trademark Office*